US012701473B2

(12) United States Patent　(10) Patent No.:　US 12,701,473 B2
Lin　(45) Date of Patent:　Aug. 4, 2026

(54) COMMUNICATION DEVICE AND METHOD FOR HANDLING EVALUATIONS FOR CANDIDATE TARGET PRIMARY SECONDARY CELLS

(71) Applicant: ACER INCORPORATED, New Taipei City (TW)

(72) Inventor: Jung-Mao Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 304 days.

(21) Appl. No.: 18/636,163

(22) Filed: Apr. 15, 2024

(65) Prior Publication Data

US 2024/0381197 A1　Nov. 14, 2024

Related U.S. Application Data

(60) Provisional application No. 63/464,638, filed on May 8, 2023.

(51) Int. Cl.
*H04W 36/00*　(2009.01)
(52) U.S. Cl.
CPC ............................. *H04W 36/00835* (2018.08)
(58) Field of Classification Search
None
See application file for complete search history.

(56) References Cited

U.S. PATENT DOCUMENTS

| | | | |
|---|---|---|---|
| 2022/0116840 A1 * | 4/2022 | Purkayastha | ......... H04L 1/1896 |
| 2023/0217327 A1 * | 7/2023 | Yan | ................... H04W 36/0079 |
| | | | 455/436 |
| 2025/0081055 A1 * | 3/2025 | Stanczak | ......... H04W 36/00835 |

FOREIGN PATENT DOCUMENTS

WO　2023/010385 A1　2/2023

OTHER PUBLICATIONS

Transsion Holdings, Discussion on Selective Activation of Cell Groups in NR-DC, 3GPP TSG-RAN WG2 Meeting #121be, R2-2303475, Apr. 17-Apr. 23, 2023, XP052365736 ,Apr. 17, 2023.
ZTE Corporation, Sanechips, Discussion on selective activation of the cell groups, 3GPP TSG-RAN WG2 Meeting #121, R2-2301218, Athens, Greece, Feb. 27-Mar. 3, 2023, XP052245856 ,Feb. 27, 2023.

(Continued)

*Primary Examiner* — Hong S Cho
(74) *Attorney, Agent, or Firm* — Winston Hsu

(57)　　　ABSTRACT

A communication device for handling evaluations for a plurality of candidate target primary secondary cells (PS-cells) (CTPSs) includes at least one storage device and at least one processing circuit coupled to the at least one storage device. The at least one storage device stores instructions, and the at least one processing circuit is configured to execute the instructions of receiving a configuration comprising a plurality of execution conditions (ECs) from a network, wherein the plurality of ECs correspond to the plurality of CTPSs, respectively; evaluating the plurality of ECs to obtain a first evaluation event; performing a first PScell procedure with a first CTPS of the plurality of CTPSs according to the first evaluation event; reconfiguring at least one EC corresponding to at least one CTPS of the plurality of CTPSs; and evaluating the at least one EC to obtain a second evaluation event.

55 Claims, 14 Drawing Sheets

(56)            References Cited

OTHER PUBLICATIONS

Qualcomm Incorporated, Report of [Post121][044][eMob] SCG Selective Activation in NR-DC Signalling interaction, 3GPP TSG-RAN WG2 #121-bis-e, R2-2302934, E-Meeting, Apr. 17-Apr. 26, 2023, XP052289340 ,Apr. 17, 2023.
ZTE Corporation, Sanechips, Consideration on SCG selective activation, 3GPP TSG-RAN WG2 Meeting #121bis-e, R2-2303427, e-Meeting, Apr. 17-Apr. 26, 2023, Apr. 17, 2023.

* cited by examiner

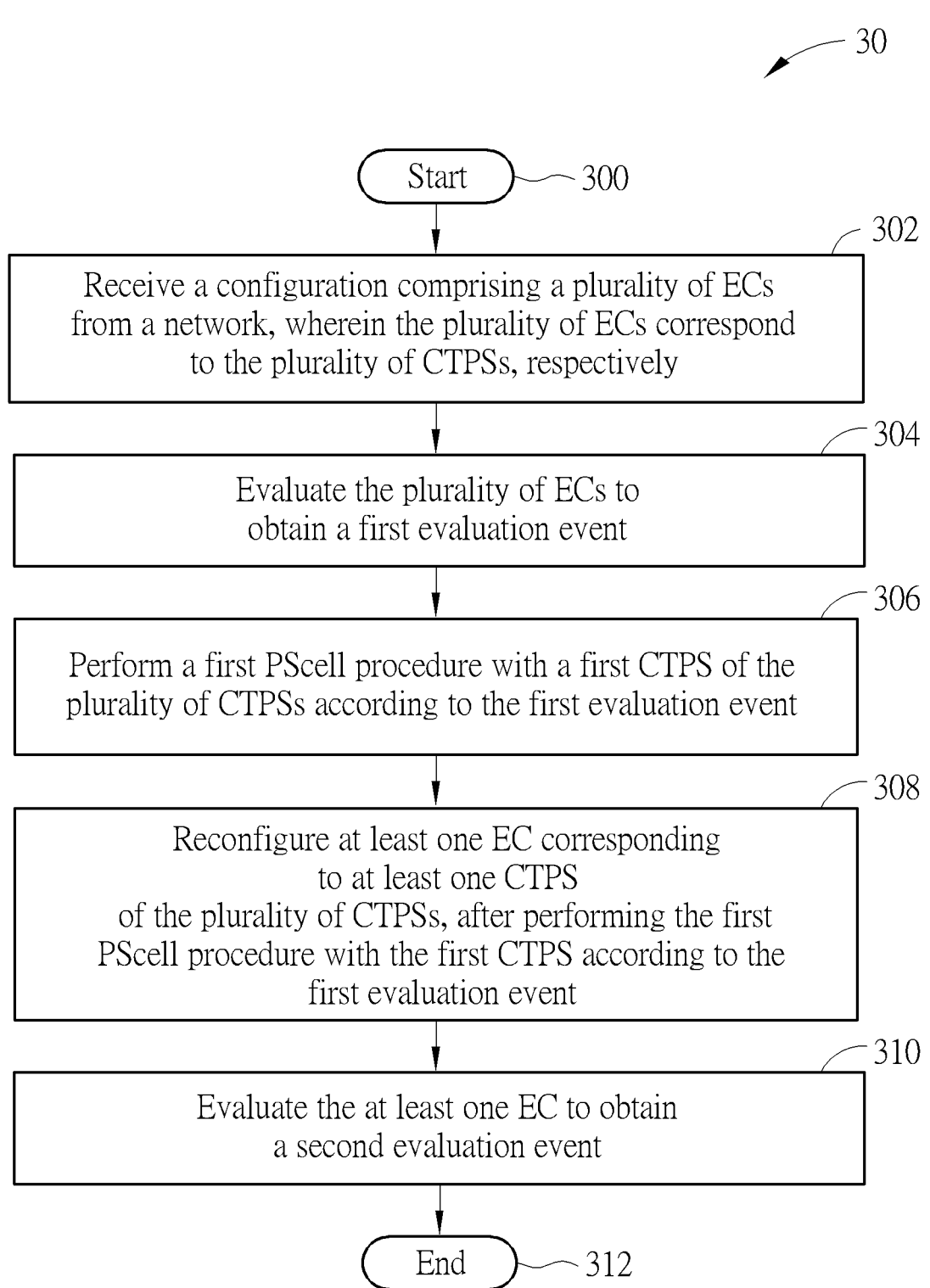

30

Start — 300

302

Receive a configuration comprising a plurality of ECs
from a network, wherein the plurality of ECs correspond
to the plurality of CTPSs, respectively

304

Evaluate the plurality of ECs to
obtain a first evaluation event

306

Perform a first PScell procedure with a first CTPS of the
plurality of CTPSs according to the first evaluation event

308

Reconfigure at least one EC corresponding
to at least one CTPS
of the plurality of CTPSs, after performing the first
PScell procedure with the first CTPS according to the
first evaluation event

310

Evaluate the at least one EC to obtain
a second evaluation event

End — 312

FIG. 3

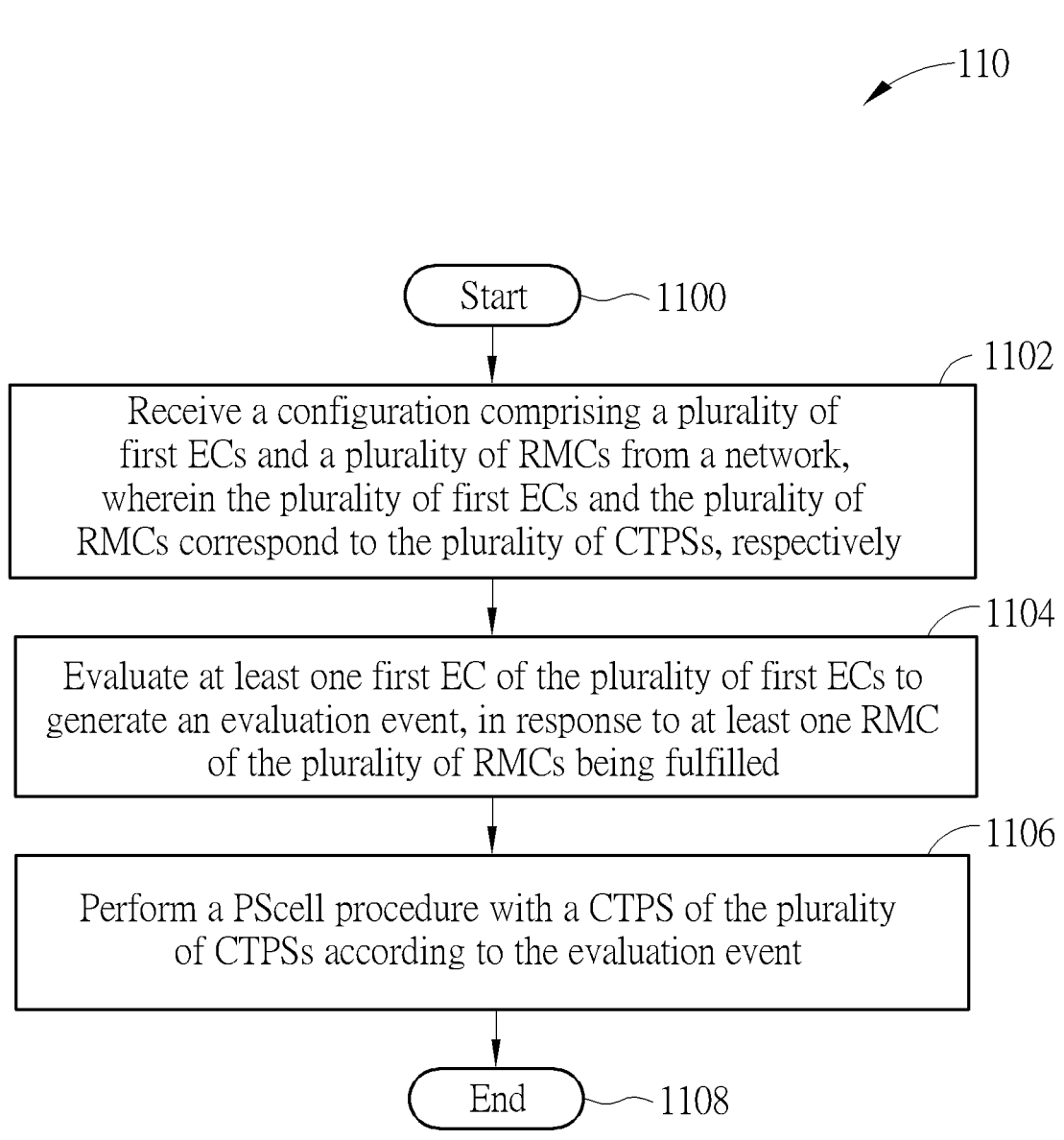

110

Start ⎯ 1100

1102

Receive a configuration comprising a plurality of
first ECs and a plurality of RMCs from a network,
wherein the plurality of first ECs and the plurality of
RMCs correspond to the plurality of CTPSs, respectively

1104

Evaluate at least one first EC of the plurality of first ECs to
generate an evaluation event, in response to at least one RMC
of the plurality of RMCs being fulfilled

1106

Perform a PScell procedure with a CTPS of the plurality
of CTPSs according to the evaluation event End ⎯ 1108

FIG. 11

COMMUNICATION DEVICE AND METHOD FOR HANDLING EVALUATIONS FOR CANDIDATE TARGET PRIMARY SECONDARY CELLS

CROSS REFERENCE TO RELATED APPLICATIONS

This application claims the benefit of U.S. Provisional Application No. 63/464,638, filed on May 8, 2023. The content of the application is incorporated herein by reference.

BACKGROUND OF THE INVENTION

1. Field of the Invention

The present disclosure relates to a device and a method used in a wireless communication system, and more particularly, to a communication device and a method for handling evaluations for candidate target primary secondary cells (PScells) (CTPSs).

2. Description of the Prior Art

A long-term evolution (LTE) system supporting the 3rd Generation Partnership Project (3GPP) Rel-8 standard and/or the 3GPP Rel-9 standard is developed by the 3GPP as a successor of the universal mobile telecommunication system (UMTS) for further enhancing performance of the UMTS to satisfy increasing needs of users.

An LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), uplink (UL) multiple-input multiple-output (UL-MIMO), etc.

A next generation radio access network (NG-RAN) supporting the 3GPP Rel-17 standard and/or the 3GPP Rel-18 standard is developed for further enhancing the LTE-A system. The NG-RAN includes one or more next generation Node-Bs (gNBs), and has properties of wider operation bands, different numerologies for different frequency ranges, massive MIMO, advanced channel codings, etc.

In dual connectivity (DC), a user equipment (UE) connects to a master node (MN) and a secondary node (SN) simultaneously. The MN and the SN correspond to a primary cell (PCell) and a primary secondary cell (PSCell), respectively. The UE frequently performs a conditional primary secondary cell (PSCell) change (CPC) procedure or a conditional PSCell addition (CPA) procedure, because the UE moves for a long time or moves quickly. However, it is power-consuming and heavily loading to evaluate which candidate target PScell (CTPS) will be the next PScell before performing the CPC procedure or the CPA procedure. Thus, how to handle evaluations for the CTPSs is an important problem to be solved.

SUMMARY OF THE INVENTION

The present disclosure therefore provides a communication device and method for handling evaluations for candidate target primary secondary cells (PScells) (CTPSs) to solve the abovementioned problem.

A communication device for handling evaluations for a plurality of candidate target primary secondary cells (PScells) (CTPSs) comprises at least one storage device and at least one processing circuit coupled to the at least one storage device. The at least one storage device stores instructions, and the at least one processing circuit is configured to execute the instructions of receiving a configuration comprising a plurality of execution conditions (ECs) from a network, wherein the plurality of ECs correspond to the plurality of CTPSs, respectively; evaluating the plurality of ECs to obtain a first evaluation event; performing a first PScell procedure with a first CTPS of the plurality of CTPSs according to the first evaluation event; reconfiguring at least one EC corresponding to at least one CTPS of the plurality of CTPSs, after performing the first PScell procedure with the first CTPS according to the first evaluation event; and evaluating the at least one EC to obtain a second evaluation event.

A method for handling evaluations for a plurality of candidate target primary secondary cells (PScells) (CTPSs) of a communication device comprises receiving a configuration comprising a plurality of execution conditions (ECs) from a network, wherein the plurality of ECs correspond to the plurality of CTPSs, respectively; evaluating the plurality of ECs to obtain a first evaluation event; performing a first PScell procedure with a first CTPS of the plurality of CTPSs according to the first evaluation event; reconfiguring at least one EC corresponding to at least one CTPS of the plurality of CTPSs, after performing the first PScell procedure with the first CTPS according to the first evaluation event; and evaluating the at least one EC to obtain a second evaluation event.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a flowchart of a process according to an example of the present disclosure.

FIG. 11 is a flowchart of a process according to an example of the present disclosure.

DETAILED DESCRIPTION

Figure 1:
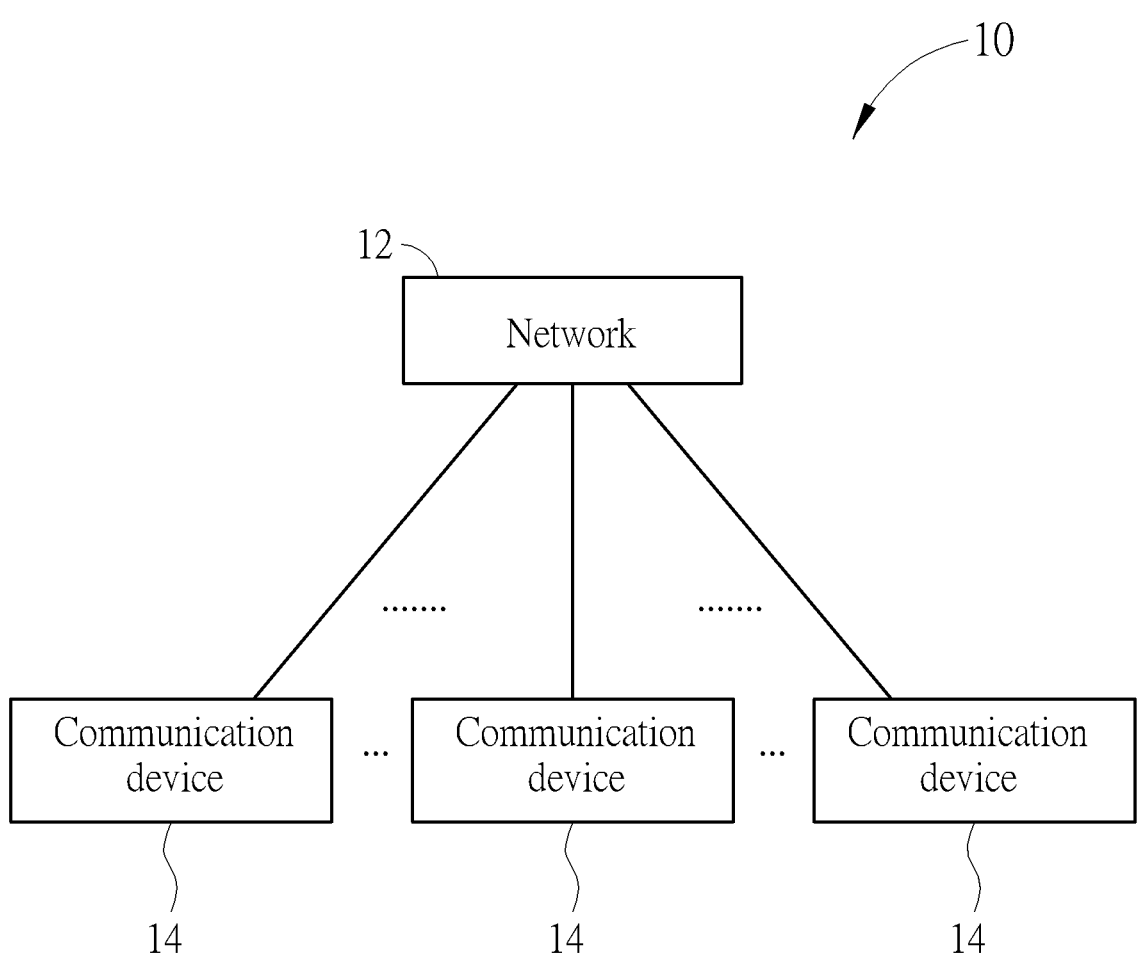
FIG. 1 is a schematic diagram of a wireless communication system according to an example of the present disclosure.

FIG. 1 is a schematic diagram of a wireless communication system 10 according to an example of the present disclosure. The wireless communication system 10 is briefly composed of a network 12 and a plurality of communication devices 14. The wireless communication system 10 may support a time-division duplexing (TDD) mode, a frequency-division duplexing (FDD) mode, a TDD-FDD joint operation mode, a non-terrestrial network (NTN) mode or a licensed-assisted access (LAA) mode. That is, the network 12 and a communication device 14 may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network 12 and a communication device 14 may communicate with each other via multiple serving cells (e.g., multiple serving carriers) including a primary cell (e.g., primary component carrier) and one or more secondary cells (e.g., secondary component carriers).

In FIG. 1, the network 12 and the communication devices 14 are simply utilized for illustrating the structure of the wireless communication system 10. Practically, the network 12 may be a universal terrestrial radio access network (UTRAN) including at least one Node-B (NB) in a universal mobile telecommunications system (UMTS). In one example, the network 12 may be an evolved UTRAN (E-UTRAN) including at least one evolved NB (eNB) and/or at least one relay node in a long term evolution (LTE) system, an LTE-Advanced (LTE-A) system, an evolution of the LTE-A system, etc. In one example, the network 12 may be a next generation radio access network (NG-RAN) including at least one next generation Node-B (gNB) and/or at least one fifth generation (5G) base station (BS). In one example, the gNB or the 5G BS of network 12 may include a NTN Gateway and a NTN payload. In one example, the network 12 may be any BS conforming to a specific communication standard to communicate with a communication device 14.

A new radio (NR) is a standard defined for a 5G system (or 5G network) to provide a unified air interface with better performance. gNBs are deployed to realize the 5G system, which supports advanced features such as enhanced Mobile Broadband (eMBB), Ultra Reliable LOW Latency Communications massive (URLLC), Machine Type Communications (mMTC), etc. The eMBB provides broadband services with a greater bandwidth and a low/moderate latency. The URLLC provides applications (e.g., end-to-end communication) with properties of a higher reliability and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network 12 may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), Access and Mobility Management Function (AMF), Session Management Function (SMF), User Plane Function (UPF), Authentication Server Function (AUSF), etc. In one example, after the network 12 receives information transmitted by a communication device 14, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device 14 may be a user equipment (UE), a Very Small Aperture Terminal (VSAT), a low cost device (e.g., machine type communication (MTC) device), a device-to-device (D2D) communication device, a narrowband internet of things (IoT) (NB-IoT), a mobile phone, a laptop, a tablet computer, an electronic book, a portable computer system, or combination thereof. In addition, the network 12 and the communication device 14 can be seen as a transmitter or a receiver according to direction (i.e., transmission direction), e.g., for an uplink (UL), the communication device 14 is the transmitter and the network 12 is the receiver, and for a downlink (DL), the network 12 is the transmitter and the communication device 14 is the receiver.

Figure 2:
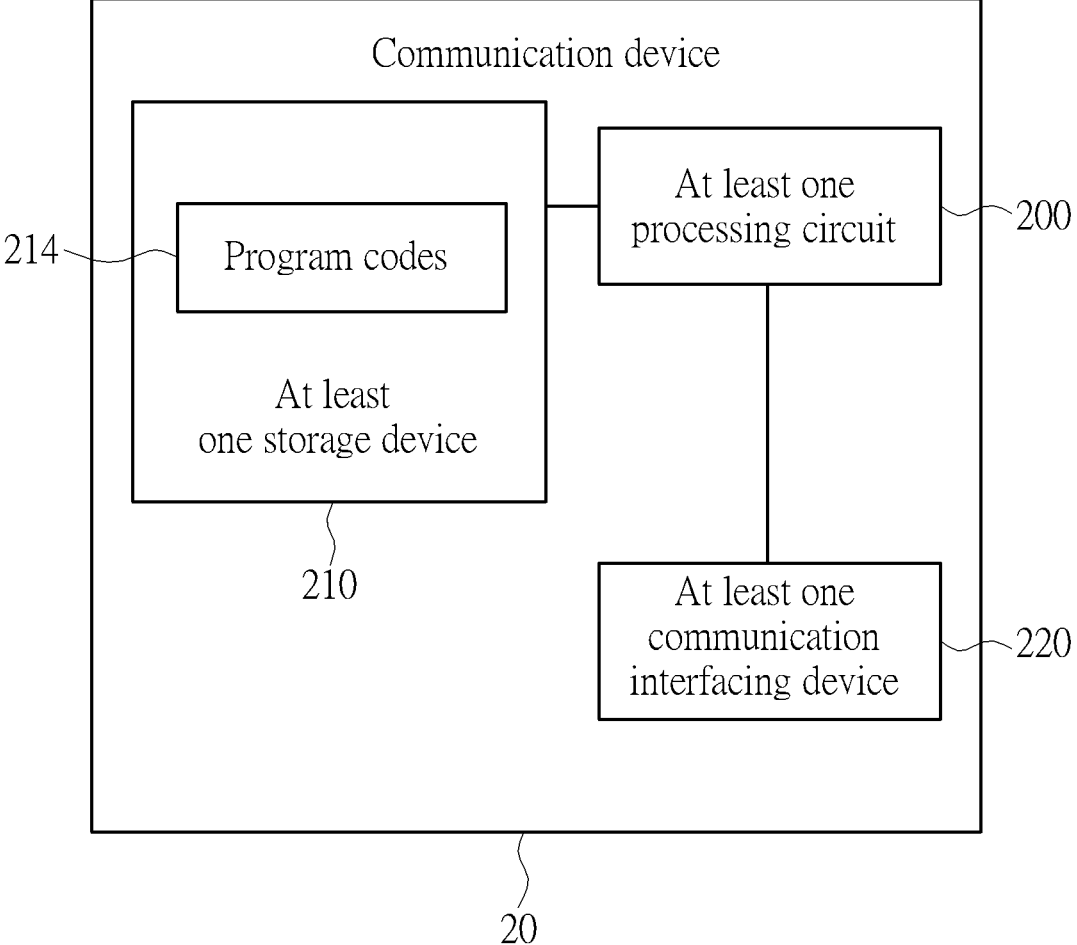
FIG. 2 is a schematic diagram of a communication device according to an example of the present disclosure.

FIG. 2 is a schematic diagram of a communication device 20 according to an example of the present disclosure. The communication device 20 may be a communication device 14 or the network 12 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include, but are not limited to, a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

FIG. 3 is a flowchart of a process 30 according to an example of the present disclosure. The process 30 may be utilized in a communication device (e.g., a communication device 14 in FIG. 1 or the communication device 20 in FIG. 2), to handling evaluations for a plurality of candidate target primary secondary cells (PScells) (CTPSs). The process 30 may be compiled into the program codes 214 and includes the following steps:

Step 300: Start.

Step 302: Receive a configuration comprising a plurality of execution conditions (ECs) from a network, wherein the plurality of ECs correspond to the plurality of CTPSs, respectively.

Step 304: Evaluate the plurality of ECs to obtain a first evaluation event.

Step 306: Perform a first PScell procedure with a first CTPS of the plurality of CTPSs according to the first evaluation event.

Step 308: Reconfigure at least one EC corresponding to at least one CTPS of the plurality of CTPSs, after performing the first PScell procedure with the first CTPS according to the first evaluation event.

Step 310: Evaluate the at least one EC to obtain a second evaluation event.

Step 312: End.

According to the process 30, the communication device receives a configuration comprising a plurality of ECs from a network, wherein the plurality of ECs correspond to the plurality of CTPSs, respectively. Then, the communication device evaluates the plurality of ECs to obtain a first evaluation event, and performs a first PScell procedure (e.g., an initial PScell procedure) with a first CTPS of the plurality of CTPSs according to the first evaluation event. The communication device reconfigures (e.g., determines, selects, replaces) at least one EC corresponding to at least one CTPS of the plurality of CTPSs, after performing the first PScell procedure with the first CTPS according to the first evaluation event. The communication device evaluates the at least one EC (e.g., the reconfigured EC(s)) to obtain a second evaluation event. That is, the communication device may not evaluate all the ECs. Thus, the power consumption and the loading for the communication device are improved.

Realization of the process 30 is not limited to the above description. The following examples may be applied to realize the process 30.

In one example, the Step 304 comprises that: the communication device determines whether the plurality of ECs are fulfilled; and obtains the first evaluation event, in response to determining whether the plurality of ECs are fulfilled. In one example, the configuration may be an enhanced selective activation (eSA) configuration generated by the network. In one example, the configuration further comprises a plurality of configuration identities (IDs). In one example, the plurality of configuration IDs correspond to the plurality of CTPSs, respectively. In one example, the configuration further comprises a plurality of CTPS configurations. In one example, the plurality of CTPS configurations correspond to the plurality of CTPSs, respectively.

In one example, the Step 306 comprises that: the communication device performs the first PScell procedure with the first CTPS according to a CTPS configuration of the plurality of CTPS configurations, in response to an EC of the plurality of ECs being fulfilled. In one example, the first CTPS corresponds to the CTPS configuration and the EC. In one example, the first PScell procedure comprises (e.g., is) a conditional primary secondary cell (PSCell) change (CPC) procedure or a conditional PSCell addition (CPA) procedure.

In one example, the Step 308 comprises that: the communication device reconfigures the at least one EC within the plurality of ECs according to an EC configuration from the network. For example, the communication device releases the plurality of ECs; receives the EC configuration from the network; and reconfigures the at least one EC according to the EC configuration. In one example, the Step 308 comprises that: the communication device reconfigures the at least one EC which corresponding configuration ID is indicated in the EC configuration; and determines that the at least one CTPS corresponding to the at least one EC is an applicable cell for evaluation. In one example, the EC configuration is comprised in the configuration or is received via a dedicated control signaling (e.g., radio resource control (RRC) message). In one example, the EC configuration comprises the at least one EC and at least one configuration ID corresponding to the at least one EC. In one example, the communication device keeps the plurality of CTPS configurations and the plurality of configuration IDs, after performing the first PScell procedure with the first CTPS according to the first evaluation event.

In one example, the configuration further comprises a plurality of evaluation states (ESs). In one example, the plurality of ESs correspond to the plurality of ECs, respectively. In one example, each of the plurality of ESs indicates that a corresponding EC is or is not evaluated. For example, an ES with "active" indicates that a corresponding EC is evaluated, and an ES with "deactivate" indicates that a corresponding EC is not evaluated.

In one example, the Step 308 comprises that: the communication device configures the plurality of ESs with a first state, wherein the first state is one of "active" and "deactivate"; receives a first indicator from the network, wherein the first indicator indicates at least one first ES of the plurality of ESs; changes the at least one first ES from the first state to a second state according to the first indicator, wherein the second state is other of "active" and "deactivate"; and determines the at least one EC corresponding to at least one second ES with "active" of the plurality of ESs. That is, the communication device activates/deactivates the plurality of ESs (i.e., reconfigures the of plurality ESs with "active/deactivate"), and updates the plurality of ESs according to the first indicator.

In one example, the first indicator comprises (e.g., is) an activation indicator or a deactivation indicator. The activation indicator indicates that the at least one first ES is activated. The deactivation indicator indicates that the at least one first ES is deactivated. In one example, the first indicator may be a medium access control (MAC) control element (CE) or a RRC message. In one example, the at least one first ES is the same as the at least one second ES, if the first indicator comprises (e.g., is) the activation indicator. In one example, the at least one first ES is different from the at least one second ES, if the first indicator comprises (e.g., is) the deactivation indicator.

In one example, the Step 308 comprises that: the communication device keeps the plurality of ESs; receives a second indicator from the network, wherein the second indicator indicates a plurality of updated ESs corresponding to the plurality of ECs; changes the plurality of ESs to the plurality of updated ESs according to the second indicator; and determines the at least one EC corresponding to at least one ES with "active" of the plurality of ESs. That is, the second indicator indicates a plurality of updated states corresponding to the plurality of ESs, and the communication device updates the plurality of ESs according to the second indicator. Each of plurality of updated states is "active" or "deactivate".

In one example, the second indicator comprises (e.g., is) an ES indicator. In one example, the second indicator comprises the plurality of configuration IDs and the plurality of updated ESs. In one example, the second indicator comprises (e.g., is) a bitmap. In one example, the bitmap comprises a plurality of bits indicating the plurality of updated states corresponding to the plurality of ESs, respectively. For example, a bit with "1" indicates that a corresponding updated state is "active", and a bit with "0" indicates that a corresponding updated state is "deactivate". For example, a bit with "0" indicates that a corresponding updated state is "active", and a bit with "1" indicates that a corresponding updated state is "deactivate". For example, a bit with "1" indicates that a corresponding updated state is change, and a bit with "0" indicates that a corresponding updated state is kept. For example, a bit with "O" indicates that a corresponding updated state is change, and a bit with "1" indicates that a corresponding updated state is kept. In one example, the second indicator may be a medium access control (MAC) control element (CE) or a RRC message.

In one example, the configuration further comprises a plurality of cell lists. A cell list is a triggering condition (TC) for determining (e.g., deciding) the EC(s) to be evaluated. A TC for a CTPS is fulfilled means that the ID of the current PSCell of the communication device within a cell list corresponding to the CTPS. Otherwise, the TC for the CTPS is not fulfilled. In one example, the plurality of cell lists correspond to the plurality of ECs and the plurality of CTPSs, respectively. In one example, the Step 308 comprises that: the communication device selects at least one cell list from the plurality of cell lists, wherein each of the at least one cell list comprises a CTPS ID of the first CTPS; and determines the at least one EC corresponding to the at least one cell list. That is, the communication device determines (e.g., checks) whether an ID of a current PSCell of the communication device is within the plurality of cell lists. In one example, a cell list may be a null entry (i.e., comprise no CTPS ID). In one example, the communication device performs a CPA procedure with a CTPS, if a cell list corresponding to the CTPS is a null entry. In one example, the communication device performs a CPC procedure with a CTPS, if a cell list corresponding to the CTPS is not a null entry.

In one example, the configuration further comprises a plurality of lists. The plurality of lists may be termed as the plurality of evaluation lists. In one example, the plurality of lists correspond to the plurality of CTPSs, respectively. In one example, the Step 308 comprises that: the communication device selects a list corresponding to the first CTPS (e.g., a current PSCell of the communication device) from the plurality of lists; and reconfigures the at least one EC according to the list. In one example, the list comprises at least one of at least one CTPS ID and at least one configuration ID corresponding to the at least one EC. That is, the list indicates the EC(s) to be evaluated. In one example, the Step 308 comprises that: the communication device reconfigures the at least one EC which corresponding configuration ID is indicated in the list; and determines that the at least one CTPS corresponding to the at least one EC is an applicable cell for evaluation.

In one example, the Step 310 comprises that: the communication device determines whether the at least one EC is fulfilled; and obtains the second evaluation event, in response to determining whether the at least one EC is fulfilled.

In one example, the configuration further comprises a threshold. The threshold is an evaluation condition for determining (e.g., deciding) whether the communication device evaluates the plurality of ECs or the at least one EC. In one example, the evaluation condition is fulfilled means that a signal quality for the current PSCell of the communication device smaller than (or below) the threshold. Otherwise, the evaluation condition is not fulfilled. In one example, the communication device evaluates the plurality of ECs to generate the first evaluation event, in response to the evaluation condition being fulfilled. In one example, the communication device evaluates the at least one EC to generate the second evaluation event, in response to the evaluation condition being fulfilled. In one example, the communication device does not evaluate the plurality of ECs or the at least one EC, in response to the evaluation condition being not fulfilled. In one example, the signal quality may be a signal-to-noise ratio (SNR) or a signal power, but not limited herein.

In one example, the network comprises (e.g., is) a master node (MN) or a secondary node (SN). In one example, the communication device performs a second PScell procedure (e.g., a subsequence PScell procedure) with a second CTPS of the plurality of CTPSs according to the second evaluation event. In one example, the second PScell procedure comprises (e.g., is) a CPC procedure or a CPA procedure. In one example, the communication device negotiates with the network and the plurality of CTPSs, before receiving the configuration from the network. During the negotiation, the plurality of CTPSs provide the plurality of CTPS configurations to the communication device and the network, respectively. In one example, the communication device evaluates the plurality of ECs to obtain the first evaluation event, in response to a current PScell of the communication device being not in the configuration. That is, the communication device evaluates all the ECs comprised in the configuration, when information (e.g., a configuration ID, an EC and/or a CTPS configuration) for the current PScell is not comprised in the configuration.

Figure 4:
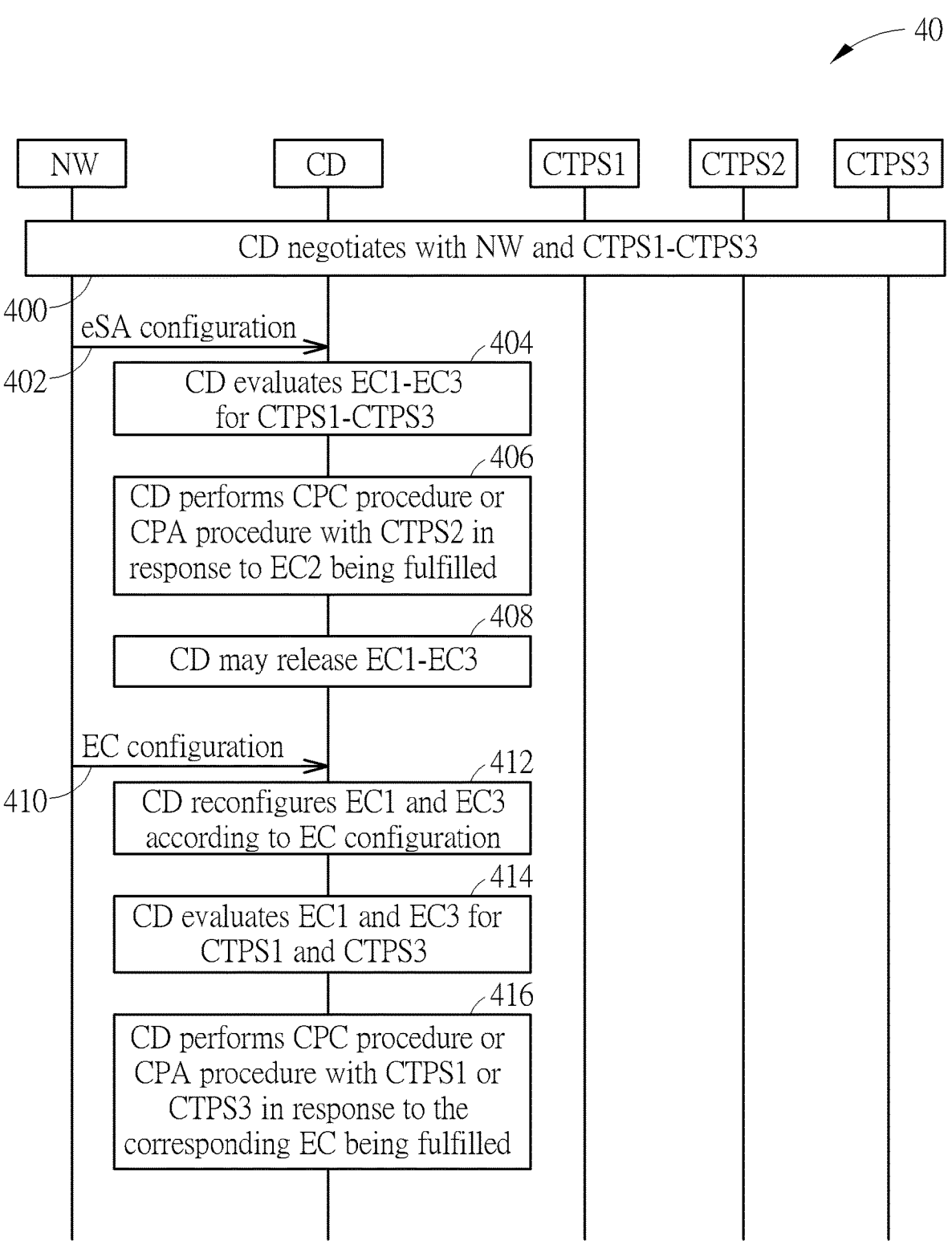
FIG. 4 is a sequence diagram of a process according to an example of the present disclosure.

FIG. 4 is a sequence diagram of a process 40 according to an example of the present disclosure. In FIG. 4, there are a network NW, a communication device CD and three CTPSs CTPS1-CTPS3 for the communication device CD. The communication device CD negotiates with the network NW and the CTPSs CTPS1-CTPS3 (Step 400). Then, the network NW transmits an eSA configuration to the communication device (Step 402). The eSA configuration which can be referred to Table 1 comprises configuration IDs 1-3, the ECs EC1-EC3 and CTPS configurations CTPS_Config1-CTPS_Config3 for the CTPSs CTPS1-CTPS3. The communication device CD evaluates the ECs EC1-EC3 for the CTPSs CTPS1-CTPS3 (Step 404), and performs a CPC procedure or a CPA procedure with the CTPS CTPS2 in response to the EC EC2 being fulfilled (Step 406). The communication device CD may release the ECs EC1-EC3 (Step 408), after performs the CPC procedure or the CPA procedure. Accordingly, the eSA configuration is changed from Table 1 to Table 2.

TABLE 1

| Configuration ID | EC | CTPS configuration |
|---|---|---|
| 1 | EC1 | CTPS_Config1 |
| 2 | EC2 | CTPS_Config2 |
| 3 | EC3 | CTPS_Config3 |

TABLE 2

| Configuration ID | EC | CTPS configuration |
|---|---|---|
| 1 | | CTPS_Config1 |
| 2 | | CTPS_Config2 |
| 3 | | CTPS_Config3 |

In FIG. 4, the communication device CD receives an EC configuration from the network NW (Step 410). The EC configuration which can be referred to Table 3 comprises the configuration IDs 1 and 3 and the ECs EC1 and EC3. The communication device CD reconfigures the ECs EC1 and EC3 according to the EC configuration (Step 412). Accordingly, the eSA configuration is changed from Table 2 to Table 3. The communication device CD evaluates the ECs EC1 and EC3 for the CTPSs CTPS1 and CTPS3 (Step 414), and performs a CPC procedure or a CPA procedure with the CTPS CTPS1 or CTPS3 in response to the corresponding EC (the EC EC1 or EC3) being fulfilled (Step 416).

TABLE 3

| Configuration ID | EC |
| --- | --- |
| 1 | EC1 |
| 3 | EC3 |

TABLE 4

| Configuration ID | EC | CTPS configuration |
| --- | --- | --- |
| 1 | EC1 | CTPS_Config1 |
| 2 | | CTPS_Config2 |
| 3 | EC3 | CTPS_Config3 |

Figure 5:
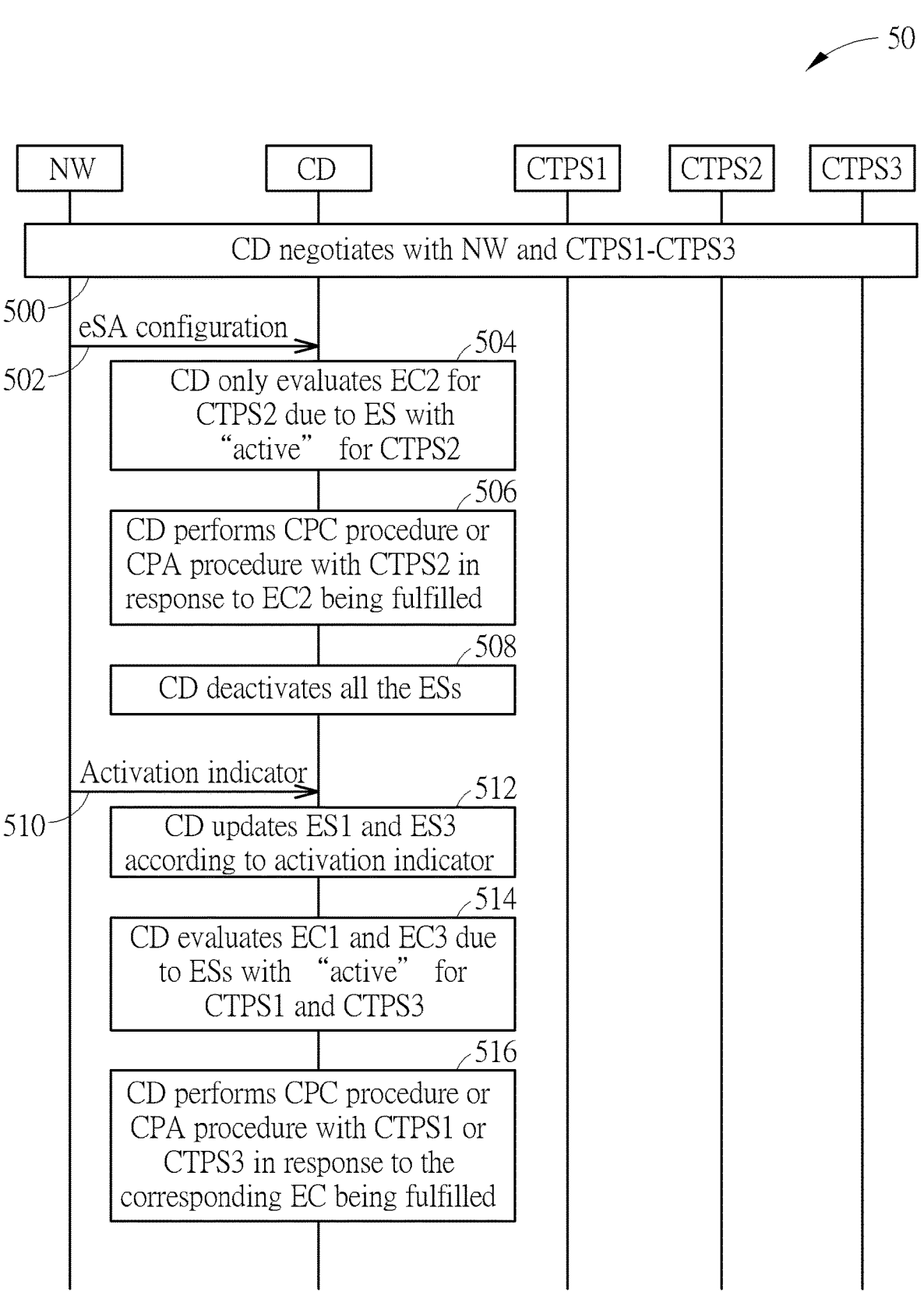
FIG. 5 is a sequence diagram of a process according to an example of the present disclosure.

FIG. 5 is a sequence diagram of a process 50 according to an example of the present disclosure. In FIG. 5, there are a network NW, a communication device CD and three CTPSs CTPS1-CTPS3 for the communication device CD. The communication device CD negotiates with the network NW and the CTPSs CTPS1-CTPS3 (Step 500). Then, the network NW transmits an eSA configuration to the communication device (Step 502). The eSA configuration which can be referred to Table 1 comprises configuration IDs 1-3, the ESs with "active/deactivate", the ECs EC1-EC3 and CTPS configurations CTPS_Config1-CTPS_Config3 for the CTPSs CTPS1-CTPS3. The communication device CD only evaluates the EC EC2 for the CTPS CTPS2 due to the ES with "active" for the CTPS CTPS2 (Step 504), and performs a CPC procedure or a CPA procedure with the CTPS CTPS2 in response to the EC EC2 being fulfilled (Step 506). After performing the CPC procedure or the CPA procedure, the communication device CD deactivates all the ESs (Step 508). Accordingly, the eSA configuration is changed from Table 5 to Table 6.

TABLE 5

| Configuration ID | ES | EC | CTPS configuration |
| --- | --- | --- | --- |
| 1 | Deactivate | EC1 | CTPS_Config1 |
| 2 | Active | EC2 | CTPS_Config2 |
| 3 | Deactivate | EC3 | CTPS_Config3 |

TABLE 6

| Configuration ID | ES | EC | CTPS configuration |
| --- | --- | --- | --- |
| 1 | Deactivate | EC1 | CTPS_Config1 |
| 2 | Deactivate | EC2 | CTPS_Config2 |
| 3 | Deactivate | EC3 | CTPS_Config3 |

In FIG. 5, the network NW transmits an activation indicator to the communication device CD (Step 510). The activation indicator which can be referred to Table 7 comprises the configuration IDs 1 and 3 for the CTPSs CTPS1 and CTPS3. The activation indicator is used to inform that which ES(s) is activated. The communication device CD updates the ESs ES1 and ES3 according to the activation indicator (Step 512). Accordingly, the eSA configuration is changed from Table 6 to Table 8. The communication device CD evaluates the ECs EC1 and EC3 due to the ESs with "active" for the CTPSs CTPS1 and CTPS3 (Step 514), and performs a CPC procedure or a CPA procedure with the CTPS CTPS1 or CTPS3 in response to the corresponding EC (the EC EC1 or EC3) being fulfilled (Step 516).

TABLE 7

| Configuration ID |
| --- |
| 1 |
| 3 |

TABLE 8

| Configuration ID | ES | EC | CTPS configuration |
| --- | --- | --- | --- |
| 1 | Active | EC1 | CTPS_Config1 |
| 2 | Deactivate | EC2 | CTPS_Config2 |
| 3 | Active | EC3 | CTPS_Config3 |

Figure 6:
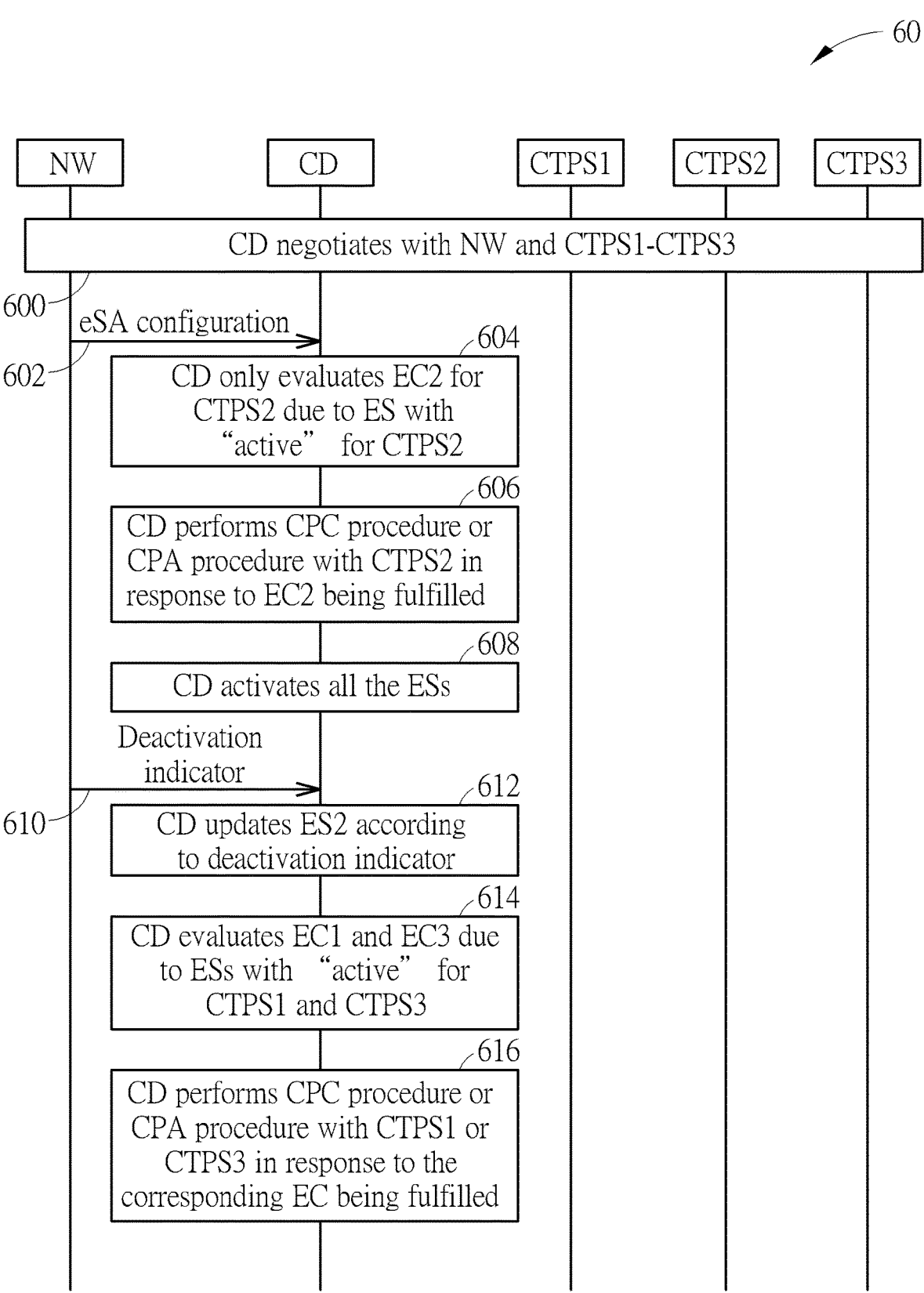
FIG. 6 is a sequence diagram of a process according to an example of the present disclosure.

FIG. 6 is a sequence diagram of a process 60 according to an example of the present disclosure. In FIG. 6, there are a network NW, a communication device CD and three CTPSs CTPS1-CTPS3 for the communication device CD. Step 600-Step 606 can be referred to Step 500-Step 506, and are not narrated herein for brevity. After performing the CPC procedure or the CPA procedure, the communication device CD activates all the ESs (Step 608). Accordingly, the eSA configuration is changed from Table 5 to Table 9.

TABLE 9

| Configuration ID | ES | EC | CTPS configuration |
| --- | --- | --- | --- |
| 1 | Active | EC1 | CTPS_Config1 |
| 2 | Active | EC2 | CTPS_Config2 |
| 3 | Active | EC3 | CTPS_Config3 |

In FIG. 6, the network NW transmits a deactivation indicator to the communication device CD (Step 610). The deactivation indicator which can be referred to Table 10 comprises the configuration ID 2 for the CTPS CTPS2. The deactivation indicator is used to inform that which ES(s) is deactivated. The communication device CD updates the ES ES2 according to the deactivation indicator (Step 612). Accordingly, the eSA configuration is changed from Table 9 to Table 11. Step 614 and Step 616 can be referred to Step 514 and Step 516, and are not narrated herein for brevity.

TABLE 10

| Configuration ID |
| --- |
| 2 |

TABLE 11

| Configuration ID | ES | EC | CTPS configuration |
| --- | --- | --- | --- |
| 1 | Active | EC1 | CTPS_Config1 |
| 2 | Deactivate | EC2 | CTPS_Config2 |
| 3 | Active | EC3 | CTPS_Config3 |

Figure 7:
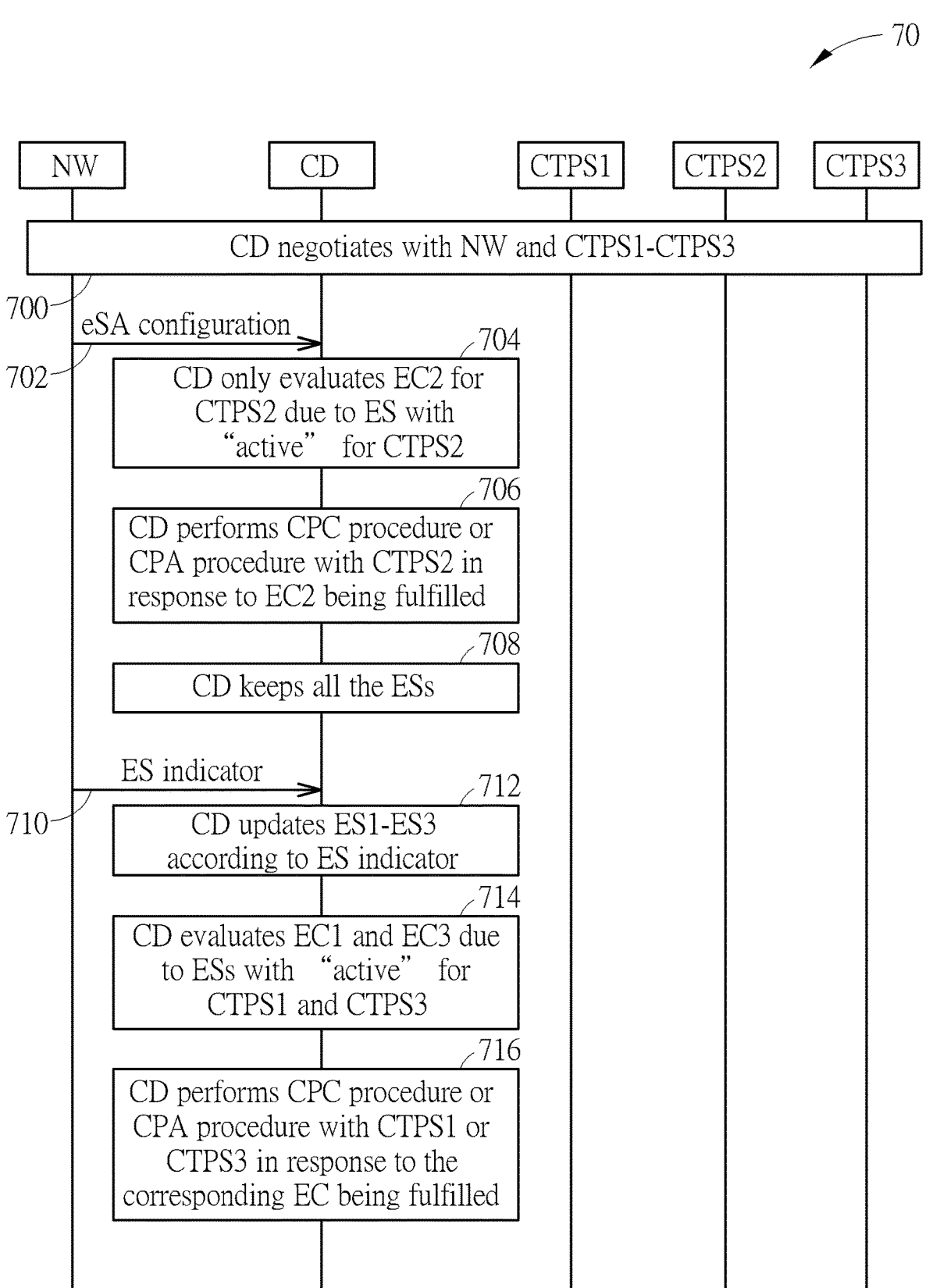
FIG. 7 is a sequence diagram of a process according to an example of the present disclosure.

FIG. 7 is a sequence diagram of a process 70 according to an example of the present disclosure. In FIG. 7, there are a network NW, a communication device CD and three CTPSs CTPS1-CTPS3 for the communication device CD. Step 700-Step 706 can be referred to Step 500-Step 506, and are not narrated herein for brevity. After performing the CPC procedure or the CPA procedure, the communication device CD keeps all the ESs (Step 708). Accordingly, the eSA configuration is not changed. Then, the network NW transmits an ES indicator to the communication device CD (Step 710). In one example, the ES indicator which can be referred to Table 12 comprises the configuration IDs 1-3 and updated ESs with "active/deactivate" for the CTPSs CTPS1-CTPS3. In one example, the ES indicator comprises a bitmap "101". A bit with "1" indicates that an updated state of the ES for the corresponding CTPS is "active", and a bit with "0" indicates that an updated state of the ES for the corresponding CTPS is "deactivate". Thus, the ES indicator comprising the bitmap "101" indicates the ESs with "active" for the CTPSs CTPS1 and CTPS3 and the ES with "deactivate" for the CTPS CTPS2.

TABLE 12

| Configuration ID | ES |
| --- | --- |
| 1 | Active |
| 2 | Deactivate |
| 3 | Active |

Then, the communication device CD updates the ESs ES1-ES3 according to the ES indicator (Step 712). Accordingly, the eSA configuration is changed from Table 5 to Table 13. Step 714 and Step 716 can be referred to Step 514 and Step 516, and are not narrated herein for brevity.

TABLE 13

| Configuration ID | ES | EC | CTPS configuration |
| --- | --- | --- | --- |
| 1 | Active | EC1 | CTPS_Config1 |
| 2 | Deactivate | EC2 | CTPS_Config2 |
| 3 | Active | EC3 | CTPS_Config3 |

Figure 8:
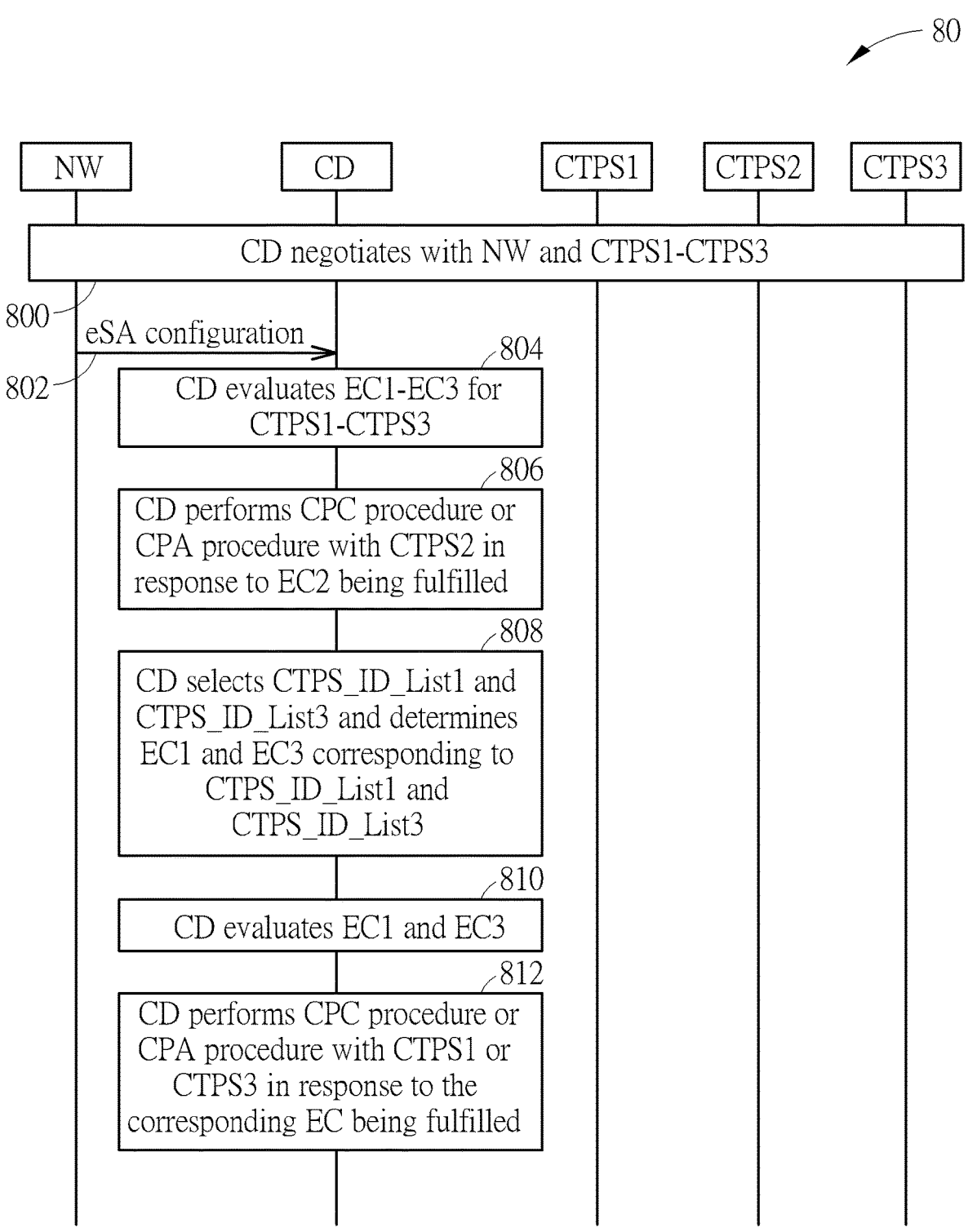
FIG. 8 is a sequence diagram of a process according to an example of the present disclosure.

FIG. 8 is a sequence diagram of a process 80 according to an example of the present disclosure. In FIG. 8, there are a network NW, a communication device CD and three CTPSs CTPS1-CTPS3 for the communication device CD. The communication device CD negotiates with the network NW and the CTPSs CTPS1-CTPS3 (Step 800). Then, the network NW transmits an eSA configuration to the communication device (Step 802). The eSA configuration which can be referred to Table 14 comprises configuration IDs 1-3, the TCs with CTPS ID lists CTPS_ID_List1-CTPS_ID_List3, the ECs EC1-EC3 and CTPS configurations CTPS_Config1-CTPS_Config3 for the CTPSs CTPS1-CTPS3. The CTPS ID list CTPS_ID_List1 comprises the CTPS IDs for the CTPSs CTPS2-CTPS3, the CTPS ID list CTPS_ID_List2 comprises the CTPS IDs for the CTPSs CTPS1 and CTPS3, and the CTPS ID list CTPS_ID_List3 comprises the CTPS IDs of the CTPSs CTPS1-CTPS2.

TABLE 14

| Configuration ID | TC | EC | CTPS configuration |
| --- | --- | --- | --- |
| 1 | CTPS_ID_List1 | EC1 | CTPS_Config1 |
| 2 | CTPS_ID_List2 | EC2 | CTPS_Config2 |
| 3 | CTPS_ID_List3 | EC3 | CTPS_Config3 |

In FIG. 8, the communication device CD evaluates the ECs EC1-EC3 for the CTPSs CTPS1-CTPS3 (Step 804), and performs a CPC procedure or a CPA procedure with the CTPS CTPS2 in response to the EC EC2 being fulfilled (Step 806). Because the CTPS ID lists CTPS_ID_List1 and CTPS_ID_List3 comprise the CTPS ID for the CTPS CTPS2 (i.e., the current PSCell of the communication device), the communication device CD selects the CTPS ID lists CTPS_ID_List1 and CTPS_ID_List3 and determines the ECs EC1 and EC3 corresponding to the CTPS ID lists CTPS_ID_List1 and CTPS_ID_List3 (Step 808). The communication device CD evaluates the ECs EC1 and EC3 (Step 810), and performs a CPC procedure or a CPA procedure with the CTPS CTPS1 or CTPS3 in response to the corresponding EC (the EC EC1 or EC3) being fulfilled (Step 812).

Figure 9:
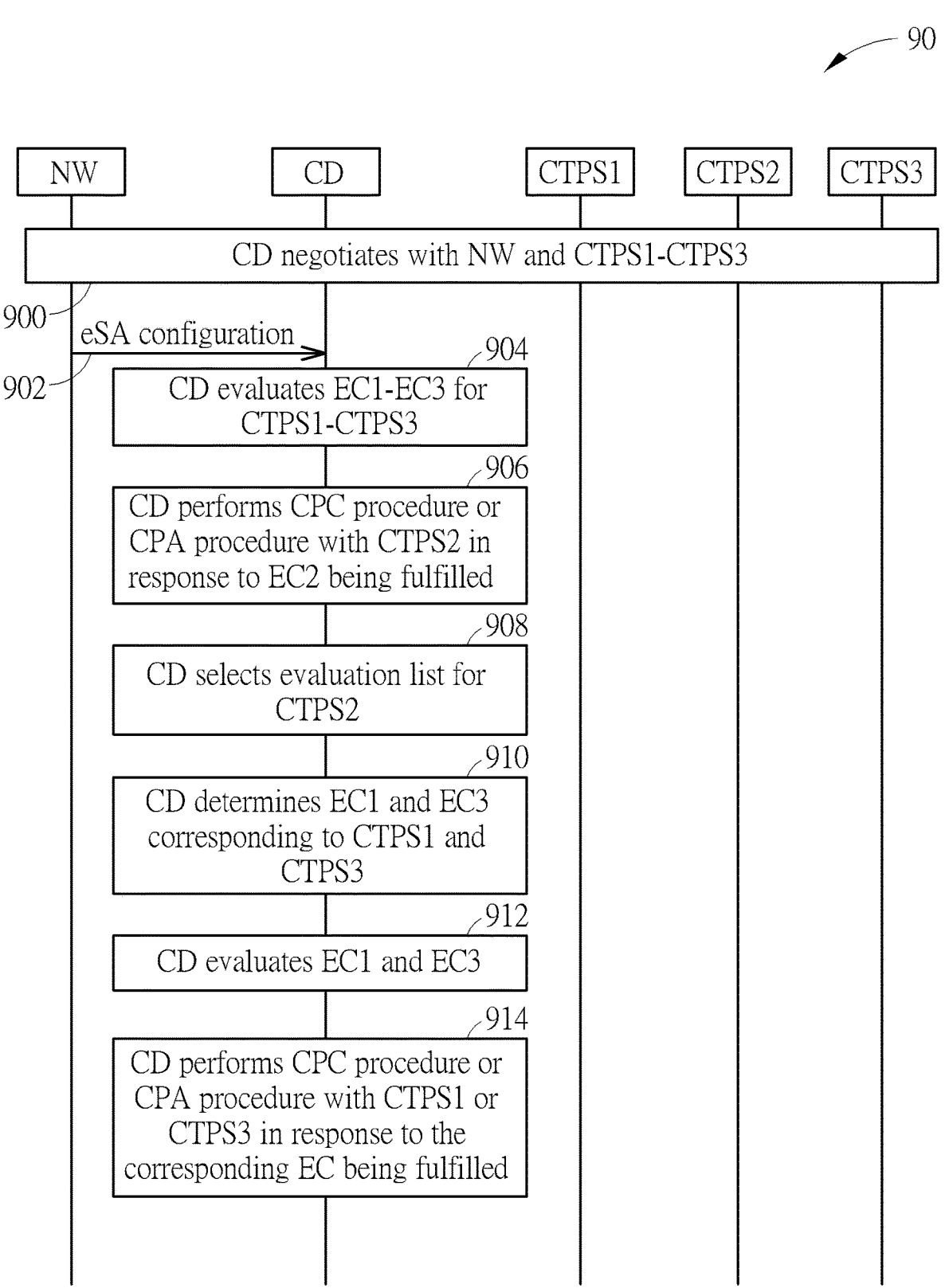
FIG. 9 is a sequence diagram of a process according to an example of the present disclosure.

FIG. 9 is a sequence diagram of a process 90 according to an example of the present disclosure. In FIG. 9, there are a network NW, a communication device CD and three CTPSs CTPS1-CTPS3 for the communication device CD. The communication device CD negotiates with the network NW and the CTPSs CTPS1-CTPS3 (Step 900). Then, the network NW transmits an eSA configuration to the communication device (Step 902).

In one example, the eSA configuration which can be referred to Table 15 comprises configuration IDs 1-3, the TCs with configuration ID lists Config_ID_List1-Config_ID_List3, the ECs EC1-EC3 and CTPS configurations CTPS_Config1-CTPS_Config3 for the CTPSs CTPS1-CTPS3. The configuration ID list Config_ID_List1 comprises the configuration IDs 2 and 3, the configuration ID list Config_ID_List2 comprises the configuration IDs 1 and 3, and the configuration ID list Config_ID_List3 comprises the configuration IDs 1 and 2. In one example, the eSA configuration which can be referred to Table 16 comprises configuration IDs 1-3, the TCs with CTPS ID lists CTPS_ID_List4-CTPS_ID_List6, the ECs EC1-EC3 and CTPS configurations CTPS_Config1-CTPS_Config3 for the CTPSs CTPS1-CTPS3. The CTPS ID list CTPS_ID_List4 comprises the CTPS IDs for the CTPSs CTPS2-CTPS3, the CTPS ID list CTPS_ID_List5 comprises the CTPS IDs of the CTPSs CTPS1 and CTPS3, and the CTPS ID list CTPS_ID_List6 comprises the CTPS IDs of the CTPSs CTPS1-CTPS2.

TABLE 15

| Configuration ID | Evaluation list | EC | CTPS configuration |
| --- | --- | --- | --- |
| 1 | Config_ID_List1 | EC1 | CTPS_Config1 |
| 2 | Config_ID_List2 | EC2 | CTPS_Config2 |
| 3 | Config_ID_List3 | EC3 | CTPS_Config3 |

TABLE 16

| Configuration ID | Evaluation list | EC | CTPS configuration |
| --- | --- | --- | --- |
| 1 | CTPS_ID_List4 | EC1 | CTPS_Config1 |
| 2 | CTPS_ID_List5 | EC2 | CTPS_Config2 |
| 3 | CTPS_ID_List6 | EC3 | CTPS_Config3 |

In FIG. 9, the communication device CD evaluates the ECs EC1-EC3 for the CTPSs CTPS1-CTPS3 (Step 904), and performs a CPC procedure or a CPA procedure with the CTPS CTPS2 in response to the EC EC2 being fulfilled (Step 906). The communication device CD selects the evaluation list for the CTPS CTPS2 (e.g., the configuration ID list Config_ID_List2 comprising the configuration IDs 1 and 3 or the CTPS ID list CTPS_ID_List5 comprising the CTPS IDs of the CTPSs CTPS1 and CTPS3) (Step 908). Because the evaluation list for the CTPS CTPS2 indicates the CTPSs CTPS1 and CTPS3, the communication device CD determines the ECs EC1 and EC3 corresponding to the CTPSs CTPS1 and CTPS3 (Step 910). Step 912 and Step 914 can be referred to Step 810 and Step 812, and are not narrated herein for brevity.

Figure 10:
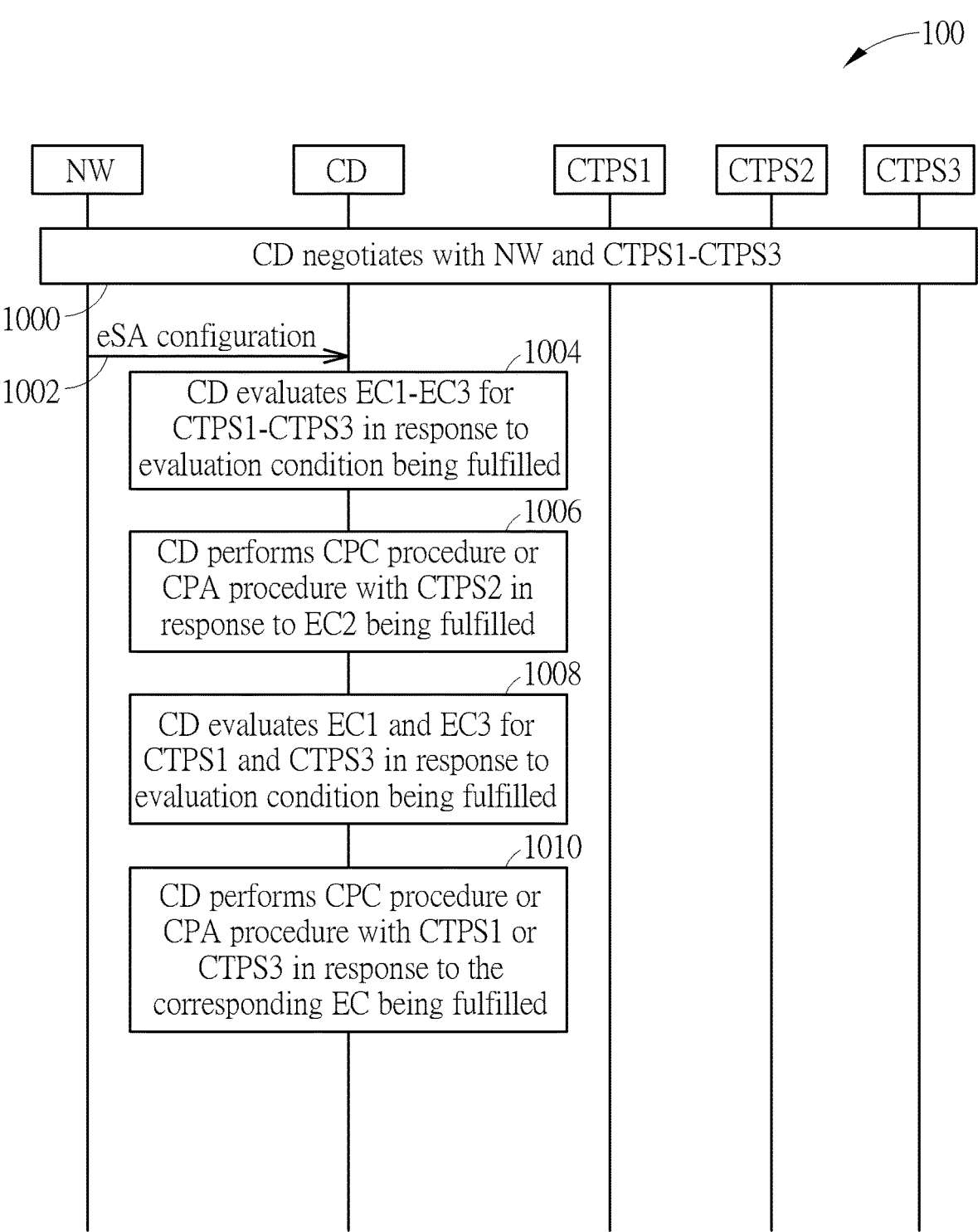
FIG. 10 is a sequence diagram of a process according to an example of the present disclosure.

FIG. 10 is a sequence diagram of a process 100 according to an example of the present disclosure. In FIG. 10, there are a network NW, a communication device CD and three CTPSs CTPS1-CTPS3 for the communication device CD. The communication device CD negotiates with the network NW and the CTPSs CTPS1-CTPS3 (Step 1000). Then, the network NW transmits an eSA configuration to the communication device (Step 1002). The eSA configuration which can be referred to Table 17 comprises configuration IDs 1-3, the ECs EC1-EC3 and CTPS configurations CTPS_Config1-CTPS_Config3 for the CTPSs CTPS1-CTPS3, and further comprises an evaluation condition with a threshold T.

TABLE 17

| Evaluation condition | Configuration ID | EC | CTPS configuration |
|---|---|---|---|
| T | 1 | EC1 | CTPS_Config1 |
|  | 2 | EC2 | CTPS_Config2 |
|  | 3 | EC3 | CTPS_Config3 |

In FIG. 10, the communication device CD evaluates the ECs EC1-EC3 for the CTPSs CTPS1-CTPS3 in response to the evaluation condition being fulfilled (Step 1004). That is, the communication device CD evaluates the ECs EC1-EC3, when the signal quality for the current PSCell of the communication device CD smaller than the threshold T. The communication device CD performs a CPC procedure or a CPA procedure with the CTPS CTPS2 in response to the EC EC2 being fulfilled (Step 1006). Then, the communication device CD evaluates the ECs EC1 and EC3 for the CTPSs CTPS1 and CTPS3 in response to the evaluation condition being fulfilled (Step 1008), and performs a CPC procedure or a CPA procedure with the CTPS CTPS1 or CTPS3 in response to the corresponding EC (the EC EC1 or EC3) being fulfilled (Step 1010).

FIG. 11 is a flowchart of a process 110 according to an example of the present disclosure. The process 110 may be utilized in a communication device (e.g., a communication device 14 in FIG. 1 or the communication device 20 in FIG. 2), to handling evaluations for a plurality of candidate target primary secondary cells (PScells) (CTPSs). The process 110 may be compiled into the program codes 214 and includes the following steps:

Step 1100: Start.

Step 1102: Receive a configuration comprising a plurality of first execution conditions (ECs) and a plurality of relaxation measurement conditions (RMCs) from a network, wherein the plurality of first ECs and the plurality of RMCs correspond to the plurality of CTPSs, respectively.

Step 1104: Evaluate at least one first EC of the plurality of first ECs to generate an evaluation event, in response to at least one RMC of the plurality of RMCs being fulfilled.

Step 1106: Perform a PScell procedure with a CTPS of the plurality of CTPSs according to the evaluation event.

Step 1108: End.

According to the process 110, the communication device receives a configuration comprising a plurality of first ECs and a plurality of RMCs from a network, wherein the plurality of first ECs and the plurality of RMCs correspond to the plurality of CTPSs, respectively. Then, the communication device evaluates at least one first EC of the plurality of first ECs to generate an evaluation event, in response to at least one RMC of the plurality of RMCs being fulfilled (e.g., fulfilled). The communication device performs a PScell procedure (e.g., an initial PScell procedure or a subsequence PScell procedure) with a CTPS of the plurality of CTPSs according to the evaluation event. That is, the plurality of RMCs are the triggering conditions for evaluating the plurality of first ECs. The communication device evaluates the EC(s), when the corresponding RMC(s) is fulfilled. Thus, the power consumption and the loading for the communication device are improved.

Realization of the process 110 is not limited to the above description. The following examples may be applied to realize the process 110.

In one example, the Step 1104 comprises that: the communication device determines whether the at least one first EC is fulfilled; and generates the evaluation event, in response to determining whether the at least one first EC is fulfilled.

In one example, the configuration may be an enhanced selective activation (eSA) configuration generated by the network. In one example, the configuration further comprises a plurality of configuration IDs. In one example, the plurality of configuration IDs correspond to the plurality of CTPSs, respectively. In one example, the configuration further comprises a plurality of CTPS configurations. In one example, the plurality of CTPS configurations correspond to the plurality of CTPSs, respectively.

In one example, the Step 1106 comprises that: the communication device performs the PScell procedure with the CTPS according to a CTPS configuration of the plurality of CTPS configurations, in response to an EC of the plurality of ECs being fulfilled. In one example, the CTPS corresponds to the CTPS configuration and the EC. In one example, the PScell procedure comprises (e.g., is) a CPC procedure or a CPA procedure.

In one example, the plurality of first ECs correspond to the plurality of RMCs, respectively. In one example, the plurality of RMCs comprise a plurality of reference symbol received power (RSRP) thresholds, respectively. A RMC for a CTPS is fulfilled (e.g., fulfilled) means that a RSRP of the CTPS is smaller than (or below) a RSRP threshold in the RMC.

Table 18 is an embodiment of the configuration as follows. Assuming that there are three CTPSs for the communication device, the Table 18 comprises configuration IDs 1-3, RMCs with RSRP thresholds RSRP_T1-RSRP_T3, ECs EC1-EC3 and CTPS configurations CTPS_Config1-CTPS_Config3 for the CTPSs CTPS1-CTPS3. In process 110, the communication device may receive Table 18 from the network, and may perform Steps 1104-1106 according to the Table 18.

TABLE 18

| Configuration ID | RMC | EC | CTPS configuration |
|---|---|---|---|
| 1 | RSRP_T1 | EC1 | CTPS_Config1 |
| 2 | RSRP_T2 | EC2 | CTPS_Config2 |
| 3 | RSRP_T3 | EC3 | CTPS_Config3 |

In one example, the plurality of RMCs comprise a plurality of relaxation parameters, respectively. That is, the plurality of relaxation parameters are configured with the plurality of RMCs, respectively. In one example, the plurality of relaxation parameters are integers.

In one example, the Step 1104 comprises that: the communication device extends at least one first measurement period (e.g., normal measurement period) of at least one evaluation measurement for the at least one first EC by at least one relaxation parameter of the plurality of relaxation parameters to generate at least one second measurement period (e.g., relaxed measurement period), in response to the at least one RMC being fulfilled; and evaluates the at least one first EC according to the at least one second measurement period, to generate the evaluation event. In one example, the at least one first EC corresponds to the at least one RMC. In one example, the at least one first measurement period is comprised in the at least one first EC. In one example, the at least one evaluation measurement for the at least one first EC is used to evaluate the at least one first EC. That is, the communication device evaluates the at least one first EC by performing the at least one evaluation measurement.

Table 19 is an embodiment of the configuration as follows. Assuming that there are three CTPSs for the communication device, Table 19 comprises configuration IDs 1-3, RMCs with RSRP thresholds RSRP_T1-RSRP_T3 and relaxation parameters RP1-RP3, ECs EC1-EC3 and CTPS configurations CTPS_Config1-CTPS_Config3 for the e CTPSs CTPS1-CTPS3. The communication device adjusts the measurement period and evaluates the EC according to Table 19. For example, the communication device extends the measurement period for the EC EC1 by the relaxation parameter RP1, in response to a PSRP of the CTPS CTPS1 smaller than the RSRP threshold RSRP_T1. For example, the communication device extends the measurement period for the EC EC2 by the relaxation parameter RP2, in response to a PSRP of the CTPS CTPS2 smaller than the RSRP threshold RSRP_T2. For example, the communication device extends the measurement period for the EC EC3 by the relaxation parameter RP3, in response to a PSRP of the CTPS CTPS3 smaller than the RSRP threshold RSRP_T3.

TABLE 19

| Configuration ID | RMC | EC | CTPS configuration |
|---|---|---|---|
| 1 | RSRP_T1 and RP1 | EC1 | CTPS_Config1 |
| 2 | RSRP_T2 and RP2 | EC2 | CTPS_Config2 |
| 3 | RSRP_T3 and RP2 | EC3 | CTPS_Config3 |

In one example, the configuration further comprises a plurality of second ECs, and the plurality of second ECs correspond to the plurality of RMCs, respectively. That is, the network may configure multiple ECs for a single CTPS. In one example, the plurality of first ECs (e.g., normal ECs) comprise a plurality of first measurement periods (e.g., normal measurement periods), respectively. In one example, the plurality of second ECs (e.g., relaxed ECs) comprise a plurality of second measurement periods (e.g., relaxed measurement periods), respectively. In one example, a first measurement period in a first EC is smaller than (or below) a second measurement period in a second EC, wherein the first EC and the second EC correspond to the same RMC. In one example, the Step 1104 may be replaced by: "Evaluates at least one second EC of the plurality of second ECs instead of the at least one first EC to generate the evaluation event, in response to the at least one RMC being fulfilled." That is, the at least one second EC is adopted for the evaluation. In one example, the at least one second EC corresponds to the at least one RMC.

Table 20 is an embodiment of the configuration as follows. Assuming that there are three CTPSs for the communication device, Table 20 comprises configuration IDs 1-3, RMCs with RSRP thresholds RSRP_T1-RSRP_T3, ECs with normal ECs N_EC1-N_EC3 and relaxed ECs R_EC1-R_EC3 and CTPS configurations CTPS_Config1-CTPS_Config3 for the CTPSs CTPS1-CTPS3. For example, the communication device may evaluate the relaxed EC R_EC1 instead of the normal EC N_EC1, in response to a PSRP of the CTPS CTPS1 smaller than the RSRP threshold RSRP_T1. For example, the communication device may evaluate the relaxed EC R_EC2 instead of the normal EC N_EC2, in response to a PSRP of the CTPS CTPS2 smaller than the RSRP threshold RSRP_T2. For example, the communication device may evaluate the relaxed EC R_EC3 instead of the normal EC N_EC3, in response to a PSRP of the CTPS CTPS3 smaller than the RSRP threshold RSRP_T3.

TABLE 20

| Configuration ID | RMC | EC | CTPS configuration |
|---|---|---|---|
| 1 | RSRP_T1 | N_EC1 and R_EC1 | CTPS_Config1 |
| 2 | RSRP_T2 | N_EC2 and R_EC2 | CTPS_Config2 |
| 3 | RSRP_T3 | N_EC3 and R_EC3 | CTPS_Config3 |

In one example, the communication device transmits a report to the network, in response to the at least one RMC being fulfilled. In one example, the report comprises at least one CTPS ID, and the at least one CTPS ID corresponds to the at least one RMC. In one example, the network determines whether to reconfigure the at least one first EC according to the report. In one example, the network transmits an EC configuration to the communication device, in response to reconfiguring the at least one first EC. In one example, the EC configuration comprises at least one reconfigured first EC and at least one configuration ID corresponding to the at least one reconfigured first EC.

In one example, the communication device transmits preference information to the network, before receiving the configuration and/or after evaluating the at least one first EC. In one example, the PScell procedure is an initial PScell procedure or a subsequence PScell procedure. In one example, the preference information is used to inform the network that the communication device prefers to adjust evaluation objectives (e.g., the ECs for the CTPSs) or to adjust evaluation measurements (e.g., measurement periods) for a subsequence PScell procedure. In one example, the preference information is generated from an application layer of the communication device according to a predefined UE profile. In one example, the network determines whether to reconfigure the plurality of first ECs according to the preference information. In one example, the network transmits an EC configuration to the communication device, in response to reconfiguring the at least one first EC. In one example, the EC configuration comprises at least one reconfigured first EC and at least one configuration ID corresponding to the at least one reconfigured first EC.

In one example, the configuration further comprises a threshold. The threshold is an evaluation condition for determining (e.g., deciding) whether the communication device evaluates the at least one first EC. In one example, the evaluation condition is fulfilled means that a signal quality for the current PSCell of the communication device smaller than (or below) the threshold. Otherwise, the evaluation condition is not fulfilled. In one example, the communication device evaluates the at least one first EC to generate the evaluation event, in response to the evaluation condition and the at least one RMC being fulfilled. In one example, the communication device does not evaluate the at least one first EC, in response to the evaluation condition being not fulfilled. In one example, the signal quality may be a signal-to-noise ratio (SNR) or a signal power, but not limited herein.

In one example, the network comprises (e.g., is) a master node (MN) or a secondary node (SN). In one example, the communication device negotiates with the network and the plurality of CTPSs, before receiving the configuration from the network. During the negotiation, the plurality of CTPSs provide the plurality of CTPS configurations to the communication device and the network, respectively.

Figure 12:
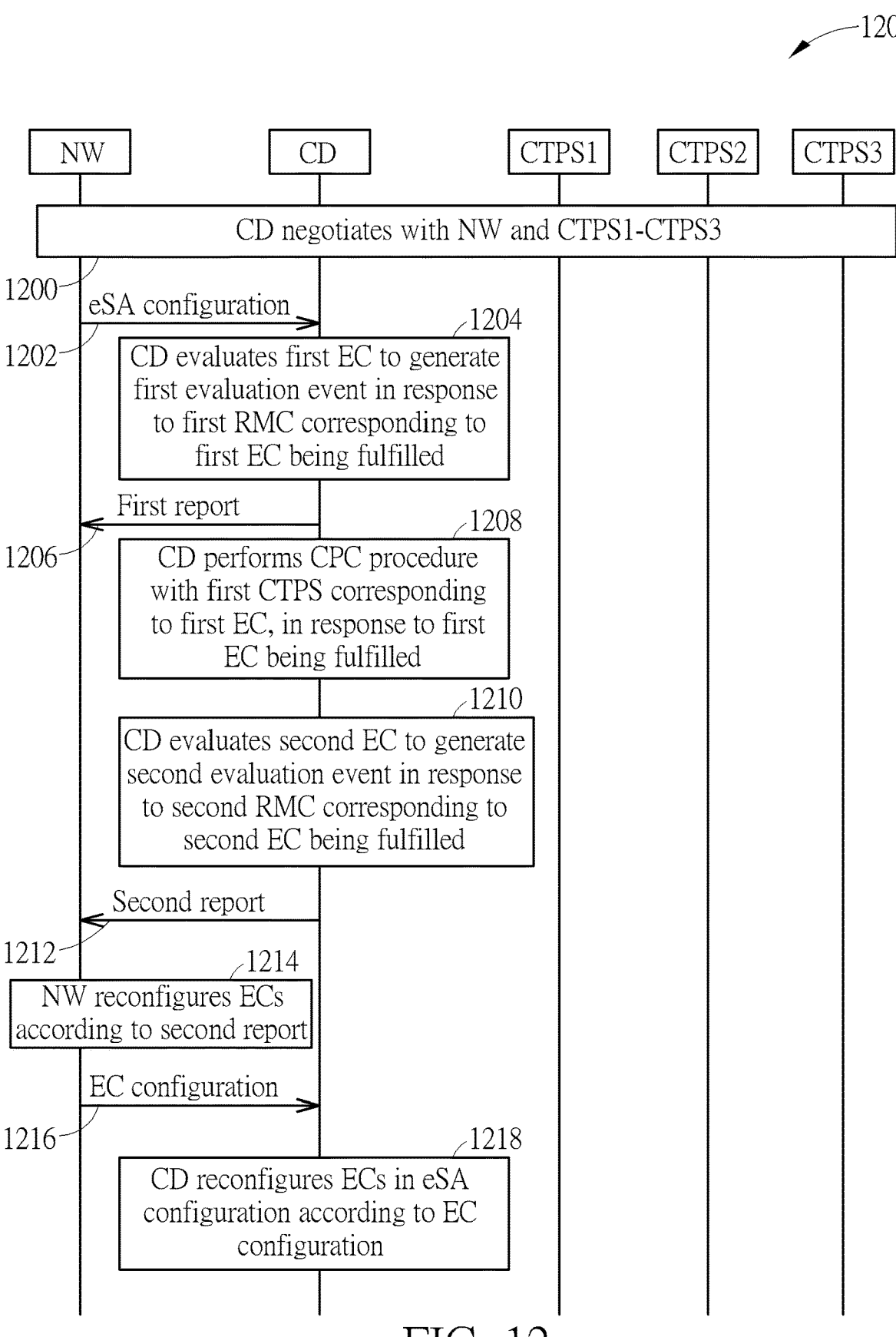
FIG. 12 is a sequence diagram of a process according to an example of the present disclosure.

FIG. 12 is a sequence diagram of a process 120 according to an example of the present disclosure. In FIG. 12, there are a network NW, a communication device CD and three CTPSs CTPS1-CTPS3 for the communication device CD. The communication device CD negotiates with the network NW and the CTPSs CTPS1-CTPS3 (Step 1200). Then, the network NW transmits an eSA configuration to the communication device (Step 1202). The eSA configuration can be referred to Table 18, and is not narrated herein for brevity. The communication device CD evaluates a first EC to generate a first evaluation event in response to a first RMC (e.g., a first RSRP threshold) corresponding to the first EC being fulfilled (Step 1204), and transmits a first report comprising a first CTPS ID corresponding to the first RMC to the network NW (Step 1206). The communication device CD performs a CPC procedure with a first CTPS (e.g., one of the CTPSs CTPS1-CTPS3) corresponding to the first EC, in response to the first EC being fulfilled (Step 1208).

In FIG. 12, the communication device CD evaluates a second EC to generate a second evaluation event in response to a second RMC (e.g., a second RSRP threshold) corresponding to the second EC being fulfilled (Step 1210), and transmits a second report comprising a second CTPS ID corresponding to the second RMC to the network NW (Step 1212). The network NW reconfigures the ECs according to the second report (Step 1214), and transmits an EC configuration comprising the reconfigured ECs to the communication device (Step 1216). Accordingly, the communication device CD reconfigures the ECs in the eSA configuration according to the EC configuration (Step 1218).

Figure 13:
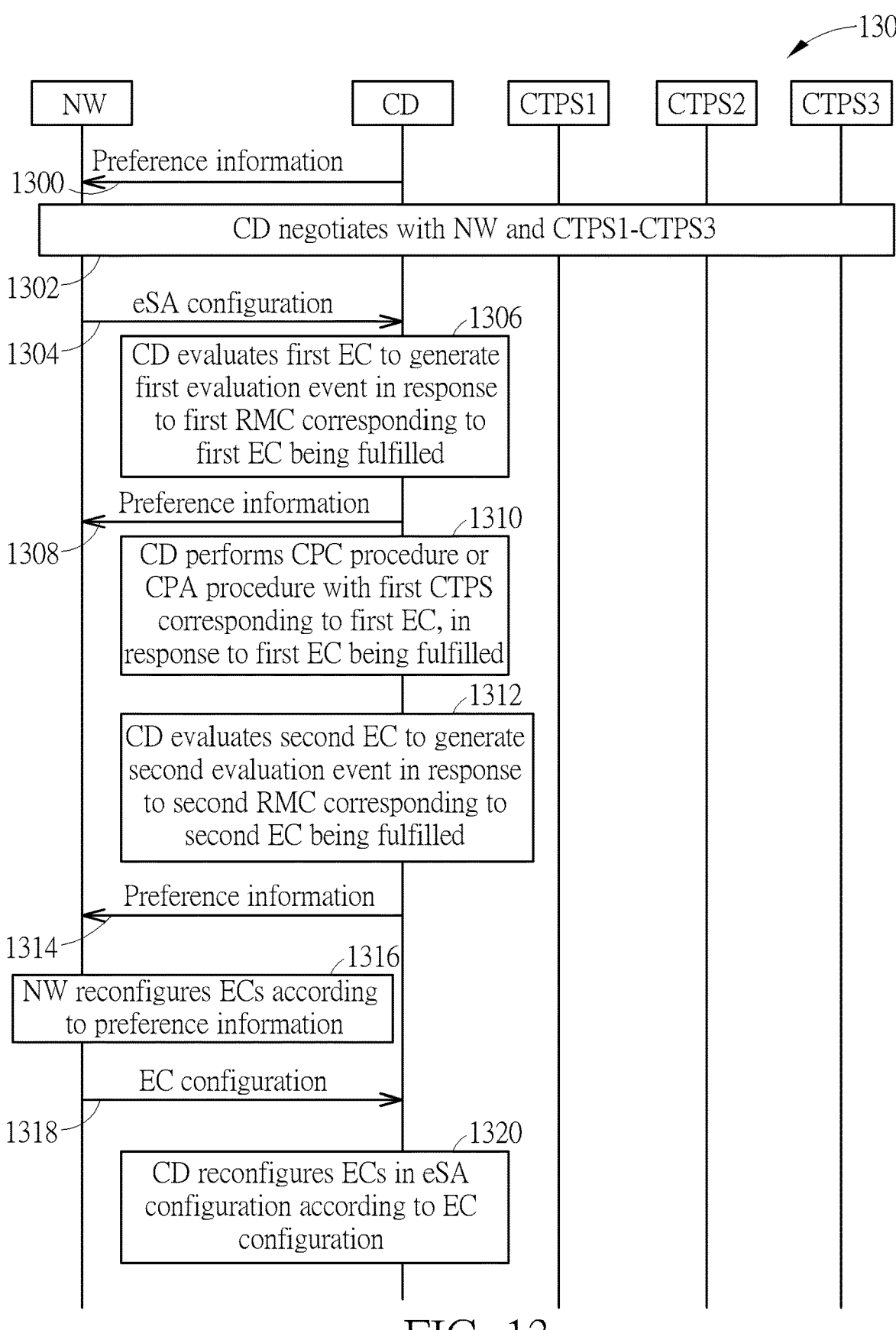
FIG. 13 is a sequence diagram of a process according to an example of the present disclosure.

FIG. 13 is a sequence diagram of a process 130 according to an example of the present disclosure. In FIG. 13, there are a network NW, a communication device CD and three CTPSs CTPS1-CTPS3 for the communication device CD. The communication device CD transmits preference information to the network NW (Step 1300). Step 1302-Step 1306 can be referred to Step 1200-Step 1204, and not narrated herein for brevity. The communication device CD transmits the preference information to the network NW (Step 1308), and performs a CPC procedure or a CPA procedure with a first CTPS (e.g., one of the CTPSs CTPS1-CTPS3) corresponding to the first EC, in response to the first EC being fulfilled (Step 1310).

In FIG. 13, the communication device CD evaluates a second EC to generate a second evaluation event in response to a second RMC (e.g., a second RSRP threshold) corresponding to the second EC being fulfilled (Step 1312). The communication device CD transmits the preference information to the network NW (Step 1314). The network NW reconfigures the ECs according to the preference information (Step 1316), and transmits an EC configuration comprising the reconfigured ECs to the communication device (Step 1318). Accordingly, the communication device CD reconfigures the ECs in the eSA configuration according to the EC configuration (Step 1320).

Figure 14:
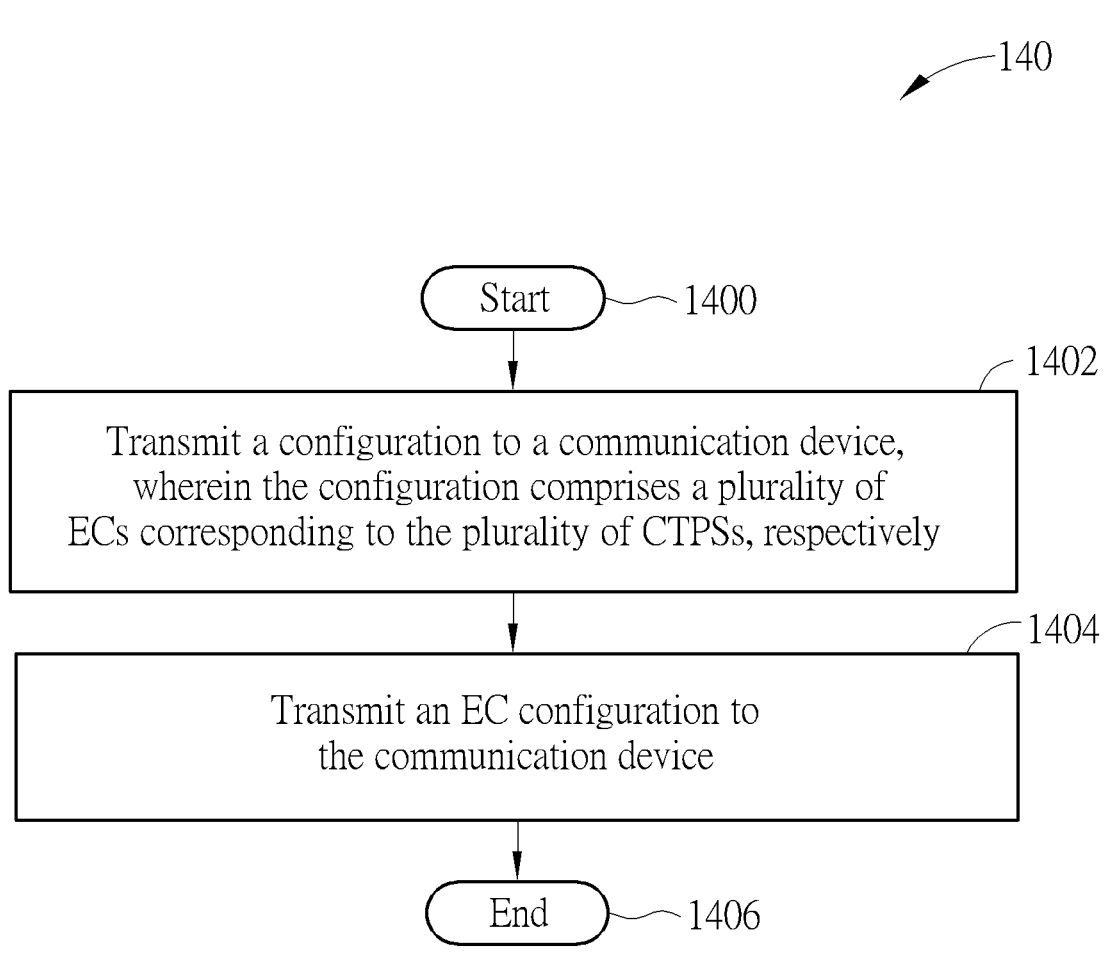
FIG. 14 is a flowchart of a process according to an example of the present disclosure.

FIG. 14 is a flowchart of a process 140 according to an example of the present disclosure. The process 140 may be utilized in a network (e.g., a network 12 in FIG. 1), to handling evaluations for a plurality of CTPSs. The process 140 may be compiled into the program codes 214 and includes the following steps:

Step 1400: Start.

Step 1402: Transmit a configuration to a communication device, wherein the configuration comprises a plurality of ECs corresponding to the plurality of CTPSs, respectively.

Step 1404: Transmit an EC configuration to the communication device.

Step 1406: End.

According to the process 140, the network transmits a configuration to a communication device, wherein the configuration comprises a plurality of ECs corresponding to the plurality of CTPSs, respectively. Then, the network transmits an EC configuration to the communication device. The configuration and the EC configuration enable the communication device to reconfigure at least one EC corresponding to at least one CTPS of the plurality of CTPSs, after the communication device performs a first PScell procedure with a first CTPS (e.g., a current PSCell of the communication device) of the plurality of CTPSs. That is, the transmitted configuration and the EC configuration may be used/applied for reconfiguring (e.g., determining) the at least one EC to be evaluated. The communication device may not evaluate all the ECs according to the transmitted configuration and the EC configuration. Thus, the power consumption and the loading for the communication device are improved.

Realization of the process 140 is not limited to the above description. The following examples may be applied to realize the process 140.

In one example, the configuration further comprises a plurality of configuration IDs, and the plurality of configuration IDs correspond to the plurality of CTPSs, respectively. In one example, the configuration further comprises a plurality of CTPS configurations. In one example, the plurality of CTPS configurations correspond to the plurality of CTPSs, respectively. In one example, the first PScell procedure comprises (e.g., is) a CPC procedure or a CPA procedure.

In one example, the EC configuration indicates at least one configuration ID corresponding to the at least one EC. In one example, the EC configuration is comprised in the configuration or is received via a dedicated control signaling (e.g., RRC message). In one example, the EC configuration comprises the at least one EC and the at least one configuration ID.

In one example, the configuration further comprises a plurality of lists. The plurality of lists may be termed as the plurality of evaluation lists. In one example, the plurality of lists correspond to the plurality of CTPSs, respectively. In one example, a list of the plurality of lists enables the communication device to reconfigure the at least one EC. In one example, the list corresponds to the first CTPS. In one example, the list comprises at least one of at least one CTPS ID and at least one configuration ID corresponding to the at least one EC. In one example, the list indicates the at least one configuration ID corresponding to the at least one EC. That is, the list indicates the EC(s) to be evaluated.

In one example, the network comprises (e.g., is) a MN or a SN. In one example, the network negotiates with the communication device and the plurality of CTPSs, before transmitting the configuration to the communication device. During the negotiation, the plurality of CTPSs provide the plurality of CTPS configurations to the communication device and the network, respectively.

The examples in the process 30 may be applied to the process 140, and are not narrated herein for brevity.

The operation of "determine" described above may be replaced by the operation of "compute", "calculate", "obtain", "generate", "output, "use", "choose/select", "decide" or "is configured to". The operation of "detect" described above may be replaced by the operation of "monitor", "receive", "sense" or "obtain". The phrase of "according to" described above may be replaced by "in response to". The phrase of "associated with" described above may be replaced by "of" or "corresponding to". The term of "via" described above may be replaced by "on", "in" or "at". The term of "when" described above may be replaced by "upon", "after" and "in response to".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module (s), the hardware and/or the electronic system to perform the related steps.

Examples of the electronic system may include a system on chip (SoC), system in package (SiP), a computer on module (COM), a computer program product, an apparatus, a mobile phone, a laptop, a tablet computer, an electronic book or a portable computer system, and the communication device 20.

To sum up, embodiments of the present disclosure provide a communication device and method for handling evaluations for CTPSs. The communication device adjusts the evaluation objectives (e.g., the ECs for the CTPSs) or adjusts the evaluation measurements (e.g., measurement periods) for the subsequence PScell procedure. Thus, the power consumption and the loading for the communication device to perform the evaluations are improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling evaluations for a plurality of candidate target primary secondary cells (PScells) (CTPSs), comprising:
    at least one storage device; and
    at least one processing circuit, coupled to the at least one storage device, wherein the at least one storage device stores instructions, and the at least one processing circuit is configured to execute the instructions of:
    receiving a configuration comprising a plurality of execution conditions (ECs) from a network, wherein the plurality of ECs correspond to the plurality of CTPSs, respectively;
    evaluating the plurality of ECs to obtain a first evaluation event;
    performing a first PScell procedure with a first CTPS of the plurality of CTPSs according to the first evaluation event;
    reconfiguring at least one EC corresponding to at least one CTPS of the plurality of CTPSs, after performing the first PScell procedure with the first CTPS according to the first evaluation event; and
    evaluating the at least one EC to obtain a second evaluation event.

2. The communication device of claim 1, wherein the instruction of evaluating the plurality of ECs to obtain the first evaluation event comprises:
    determining whether the plurality of ECs are fulfilled; and
    obtaining the first evaluation event, in response to determining whether the plurality of ECs are fulfilled.

3. The communication device of claim 1, wherein the configuration further comprises a plurality of configuration identities (IDs), and the plurality of configuration IDs correspond to the plurality of CTPSs, respectively.

4. The communication device of claim 1, wherein the configuration further comprises a plurality of CTPS configurations, and the plurality of CTPS configurations correspond to the plurality of CTPSs, respectively.

5. The communication device of claim 4, wherein the instruction of performing the first PScell procedure with the first CTPS of the plurality of CTPSs according to the first evaluation event comprises:
    performing the first PScell procedure with the first CTPS according to a CTPS configuration of the plurality of CTPS configurations, in response to an EC of the plurality of ECs being fulfilled.

6. The communication device of claim 5, wherein the first CTPS corresponds to the CTPS configuration and the EC.

7. The communication device of claim 1, wherein the first PScell procedure comprises a conditional PSCell change (CPC) procedure or a conditional PSCell addition (CPA) procedure.

8. The communication device of claim 1, wherein the instruction of reconfiguring the at least one EC corresponding to the at least one CTPS of the plurality of CTPSs comprises:

reconfiguring the at least one EC within the plurality of ECs according to an EC configuration from the network.

9. The communication device of claim 8, wherein the instruction of reconfiguring the at least one EC comprises:

reconfiguring the at least one EC which corresponding configuration ID is indicated in the EC configuration; and determining that the at least one CTPS corresponding to the at least one EC is an applicable cell for evaluation.

10. The communication device of claim 8, wherein the EC configuration is comprised in the configuration or is received via a dedicated control signaling.

11. The communication device of claim 8, wherein the EC configuration comprises the at least one EC and at least one configuration ID corresponding to the at least one EC.

12. The communication device of claim 1, wherein the configuration further comprises a plurality of lists, and the plurality of lists correspond to the plurality of CTPSs, respectively.

13. The communication device of claim 12, wherein the instruction of reconfiguring the at least one EC corresponding to the at least one CTPS of the plurality of CTPSs comprises:

selecting a list corresponding to the first CTPS from the plurality of lists; and reconfiguring the at least one EC according to the list.

14. The communication device of claim 13, wherein the list comprises at least one of at least one CTPS ID and at least one configuration ID corresponding to the at least one EC.

15. The communication device of claim 13, wherein the instruction of reconfiguring the at least one EC according to the list comprises:

reconfiguring the at least one EC which corresponding configuration ID is indicated in the list; and determining that the at least one CTPS corresponding to the at least one EC is an applicable cell for evaluation.

16. The communication device of claim 1, wherein the instruction of evaluating the at least one EC to obtain the second evaluation event comprises:

determining whether the at least one EC is fulfilled; and obtaining the second evaluation event, in response to determining whether the at least one EC is fulfilled.

17. The communication device of claim 1, wherein the network comprises a master node (MN) or a secondary node (SN).

18. The communication device of claim 1, wherein the instructions further comprises:

performing a second PScell procedure with a second CTPS of the plurality of CTPSs according to the second evaluation event.

19. The communication device of claim 18, wherein the second PScell procedure comprises a CPC procedure or a CPA procedure.

20. The communication device of claim 1, wherein the instructions further comprises:

negotiating with the network and the plurality of CTPSs, before receiving the configuration from the network.

21. The communication device of claim 1, wherein the communication device evaluates the plurality of ECs to obtain the first evaluation event, in response to a current PScell of the communication device being not in the configuration.

22. A method for handling evaluations for a plurality of candidate target primary secondary cells (PScells) (CTPSs) of a communication device, comprising:

receiving a configuration comprising a plurality of execution conditions (ECs) from a network, wherein the plurality of ECs correspond to the plurality of CTPSs, respectively;

evaluating the plurality of ECs to obtain a first evaluation event;

performing a first PScell procedure with a first CTPS of the plurality of CTPSs according to the first evaluation event;

reconfiguring at least one EC corresponding to at least one CTPS of the plurality of CTPSs, after performing the first PScell procedure with the first CTPS according to the first evaluation event; and evaluating the at least one EC to obtain a second evaluation event.

23. The method of claim 22, wherein the step of evaluating the plurality of ECs to obtain the first evaluation event comprises:

determining whether the plurality of ECs are fulfilled; and obtaining the first evaluation event, in response to determining whether the plurality of ECs are fulfilled.

24. The method of claim 22, wherein the configuration further comprises a plurality of configuration identities (IDs), and the plurality of configuration IDs correspond to the plurality of CTPSs, respectively.

25. The method of claim 22, wherein the configuration further comprises a plurality of CTPS configurations, and the plurality of CTPS configurations correspond to the plurality of CTPSs, respectively.

26. The method of claim 25, wherein the step of performing the first PScell procedure with the first CTPS of the plurality of CTPSs according to the first evaluation event comprises:

performing the first PScell procedure with the first CTPS according to a CTPS configuration of the plurality of CTPS configurations, in response to an EC of the plurality of ECs being fulfilled.

27. The method of claim 26, wherein the first CTPS corresponds to the CTPS configuration and the EC.

28. The method of claim 22, wherein the first PScell procedure comprises a conditional PSCell change (CPC) procedure or a conditional PSCell addition (CPA) procedure.

29. The method of claim 22, wherein the step of reconfiguring the at least one EC corresponding to the at least one CTPS of the plurality of CTPSs comprises:

reconfiguring the at least one EC within the plurality of ECs according to an EC configuration from the network.

30. The method of claim 29, wherein the step of reconfiguring the at least one EC comprises:

reconfiguring the at least one EC which corresponding configuration ID is indicated in the EC configuration; and determining that the at least one CTPS corresponding to the at least one EC is an applicable cell for evaluation.

31. The method of claim 29, wherein the EC configuration is comprised in the configuration or is received via a dedicated control signaling.

32. The method of claim 29, wherein the EC configuration comprises the at least one EC and at least one configuration ID corresponding to the at least one EC.

33. The method of claim 22, wherein the configuration further comprises a plurality of lists, and the plurality of lists correspond to the plurality of CTPSs, respectively.

34. The method of claim 33, wherein the step of reconfiguring the at least one EC corresponding to the at least one CTPS of the plurality of CTPSs comprises:

selecting a list corresponding to the first CTPS from the plurality of lists; and reconfiguring the at least one EC according to the list.

35. The method of claim 34, wherein the list comprises at least one of at least one CTPS ID and at least one configuration ID corresponding to the at least one EC.

36. The method of claim 34, wherein the step of reconfiguring the at least one EC according to the list comprises:

reconfiguring the at least one EC which corresponding configuration ID is indicated in the list; and determining that the at least one CTPS corresponding to the at least one EC is an applicable cell for evaluation.

37. The method of claim 22, wherein the step of evaluating the at least one EC to obtain the second evaluation event comprises:

determining whether the at least one EC is fulfilled; and obtaining the second evaluation event, in response to determining whether the at least one EC is fulfilled.

38. The method of claim 22, wherein the network comprises a master node (MN) or a secondary node (SN).

39. The method of claim 22, further comprising:

performing a second PScell procedure with a second CTPS of the plurality of CTPSs according to the second evaluation event.

40. The method of claim 39, wherein the second PScell procedure comprises a CPC procedure or a CPA procedure.

41. The method of claim 22, further comprising:

negotiating with the network and the plurality of CTPSs, before receiving the configuration from the network.

42. The method of claim 22, wherein the communication device evaluates the plurality of ECs to obtain the first evaluation event, in response to a current PScell of the communication device being not in the configuration.

43. A method for handling evaluations for a plurality of candidate target primary secondary cells (PScells) (CTPSs) of a network, comprising:

transmitting a configuration to a communication device, wherein the configuration comprises a plurality of execution conditions (ECs) corresponding to the plurality of CTPSs, respectively; and transmitting an EC configuration to the communication device;

wherein the configuration and the EC configuration enable the communication device to reconfigure at least one EC corresponding to at least one CTPS of the plurality of CTPSs, after the communication device performs a first PScell procedure with a first CTPS of the plurality of CTPSs.

44. The method of claim 43, wherein the configuration further comprises a plurality of configuration identities (IDs), and the plurality of configuration IDs correspond to the plurality of CTPSs, respectively.

45. The method of claim 43, wherein the configuration further comprises a plurality of CTPS configurations, and the plurality of CTPS configurations correspond to the plurality of CTPSs, respectively.

46. The method of claim 43, wherein the first PScell procedure comprises a conditional PSCell change (CPC) procedure or a conditional PSCell addition (CPA) procedure.

47. The method of claim 43, wherein the EC configuration indicates at least one configuration ID corresponding to the at least one EC.

48. The method of claim 47, wherein the EC configuration is comprised in the configuration or is received via a dedicated control signaling.

49. The method of claim 47, wherein the EC configuration comprises the at least one EC and the at least one configuration ID.

50. The method of claim 43, wherein the configuration further comprises a plurality of lists, and the plurality of lists correspond to the plurality of CTPSs, respectively.

51. The method of claim 50, wherein a list of the plurality of lists enables the communication device to reconfigure the at least one EC, and the list corresponds to the first CTPS.

52. The method of claim 51, wherein the list comprises at least one of at least one CTPS ID and at least one configuration ID corresponding to the at least one EC.

53. The method of claim 51, wherein the list indicates at least one configuration ID corresponding to the at least one EC.

54. The method of claim 43, wherein the network comprises a master node (MN) or a secondary node (SN).

55. The method of claim 43, further comprising:

negotiating with the communication device and the plurality of CTPSs, before transmitting the configuration to the communication device.

* * * * *